United States Patent
Hasegawa

(10) Patent No.: US 8,165,418 B2
(45) Date of Patent: *Apr. 24, 2012

(54) IMAGE PROCESSOR

(75) Inventor: Tomohiko Hasegawa, Aichi-ken (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 981 days.

This patent is subject to a terminal disclaimer.

(21) Appl. No.: 12/057,838

(22) Filed: Mar. 28, 2008

(65) Prior Publication Data

US 2008/0240598 A1    Oct. 2, 2008

(30) Foreign Application Priority Data

Mar. 30, 2007 (JP) ................................. 2007-094454
Mar. 30, 2007 (JP) ................................. 2007-094493

(51) Int. Cl.
*G06K 9/40* (2006.01)
(52) U.S. Cl. ................... 382/274; 382/168; 382/298
(58) Field of Classification Search .................. 382/167, 382/168, 274, 279, 283, 298
See application file for complete search history.

(56) References Cited

U.S. PATENT DOCUMENTS

| | | | |
|---|---|---|---|
| 6,304,294 B1 * | 10/2001 | Tao et al. ...................... | 348/370 |
| 6,658,158 B2 | 12/2003 | Fukuhara et al. | |
| 6,741,753 B1 | 5/2004 | Moroney | |
| 6,834,125 B2 | 12/2004 | Woodell et al. | |
| 6,842,543 B2 | 1/2005 | Woodell et al. | |
| 6,885,482 B1 | 4/2005 | Kubo et al. | |
| 6,941,028 B2 | 9/2005 | Kimmel et al. | |
| 6,947,176 B1 | 9/2005 | Kubo et al. | |
| 7,251,056 B2 | 7/2007 | Matsushima | |
| 7,298,917 B2 | 11/2007 | Sakatani et al. | |
| 7,508,550 B2 | 3/2009 | Kameyama | |
| 7,570,390 B2 | 8/2009 | Mitsunaga | |

(Continued)

FOREIGN PATENT DOCUMENTS

JP    2000-197052    7/2000

(Continued)

OTHER PUBLICATIONS

Meylan et al., "Color image enhancement using a Retinex-based adaptive filter", Proc. IS&T Second European Conference on Color in Graphics, Image, and Vision (CGIV 2004), vol. 2, pp. 359-363.

(Continued)

*Primary Examiner* — Phuoc Tran
(74) *Attorney, Agent, or Firm* — Scully, Scott, Murphy & Presser, PC

(57) ABSTRACT

In an image processor, a reduced image forming unit forms a reduced image by reducing an original image. The reduced image peripheral average value generating unit generates a peripheral average value for each pixel of the reduced image. The reduced image reflectance component calculating unit calculates a reflectance component indicating a ratio of brightness between each pixel and the peripheral pixels thereof for the each pixel in the reduced image. The frequency distribution generating unit generates a frequency distribution of the frequency of each value of reflectance component calculated by the reduced image reflectance component calculating unit. The representative reflectance component determining unit determines a representative reflectance component based on the frequency distribution. The simplified correcting unit performs a simplified correcting operation for correcting the value of the target pixel in the original image by converting the value of the target pixel to an output value based on the representative reflectance component and the value of the target pixel in the original image.

23 Claims, 17 Drawing Sheets

U.S. PATENT DOCUMENTS

| | | |
|---|---|---|
| 7,876,474 B2 | 1/2011 | Kondo |
| 7,885,479 B2 | 2/2011 | Kuno |
| 7,912,308 B2 | 3/2011 | Kuno |
| 7,920,752 B2 | 4/2011 | Kuno |
| 2002/0131652 A1 | 9/2002 | Yoda |
| 2003/0026494 A1 | 2/2003 | Woodell et al. |
| 2003/0072496 A1 | 4/2003 | Woodell et al. |
| 2004/0052414 A1 | 3/2004 | Schroder |
| 2004/0091164 A1 | 5/2004 | Sakatani et al. |
| 2005/0074163 A1 | 4/2005 | Shaked |
| 2005/0226526 A1 | 10/2005 | Mitsunaga |
| 2006/0062562 A1 | 3/2006 | Utagawa |
| 2007/0040914 A1* | 2/2007 | Katagiri et al. ............ 348/221.1 |
| 2008/0107333 A1 | 5/2008 | Mazinani et al. |

FOREIGN PATENT DOCUMENTS

| | | |
|---|---|---|
| JP | 2001-69525 | 3/2001 |
| JP | 2001-78025 | 3/2001 |
| JP | 2002-281347 | 9/2002 |
| JP | 2003-69822 | 3/2003 |
| JP | 2003-219182 | 7/2003 |
| JP | 2003-333331 | 11/2003 |
| JP | 2004-165840 | 6/2004 |
| JP | 3731577 | 10/2005 |
| JP | 2006-114005 | 4/2006 |

OTHER PUBLICATIONS

U.S. Official Action dated Mar. 22, 2011 from related U.S. Appl. No. 11/848,563.
Jobson et al., "A Multiscale Retinex for Bridging the Gap Between Color Images and the Human Observation of Scenes", IEEE Transaction of Image Processing, vol. 6, No. 7, Jul. 1997, pp. 965-976.
Hines et al., "DSP Implementation of the Retinex Image Enhancement Algorithm", Proceedings of the SPIE Visual Information Processing XIII, vol. 5348 (2004), pp. 13-24.
U.S. Official Action dated Mar. 10, 2011 from related U.S. Appl. No. 11/864,251.
Japanese Official Action dated Nov. 11, 2008 together with English language translation from related U.S. Appl. No. 11/864,251.
Japanese Official Action dated Nov. 25, 2008 together with English language translation from related U.S. Appl. No. 11/864,251.
Japanese Official Action dated Sep. 14, 2010 together with English language translation from related U.S. Appl. No. 11/864,251.
Japanese Official Action dated Nov. 24, 2010 together with English language translation from related U.S. Appl. No. 11/848,692.
Japanese Decision of Rejection dated Feb. 22, 2011 together with English language translation in related U.S. Appl. No. 11/848,692.
Notice of Allowance dated Aug. 19, 2011 from related U.S. Appl. No. 11/864,251.

* cited by examiner

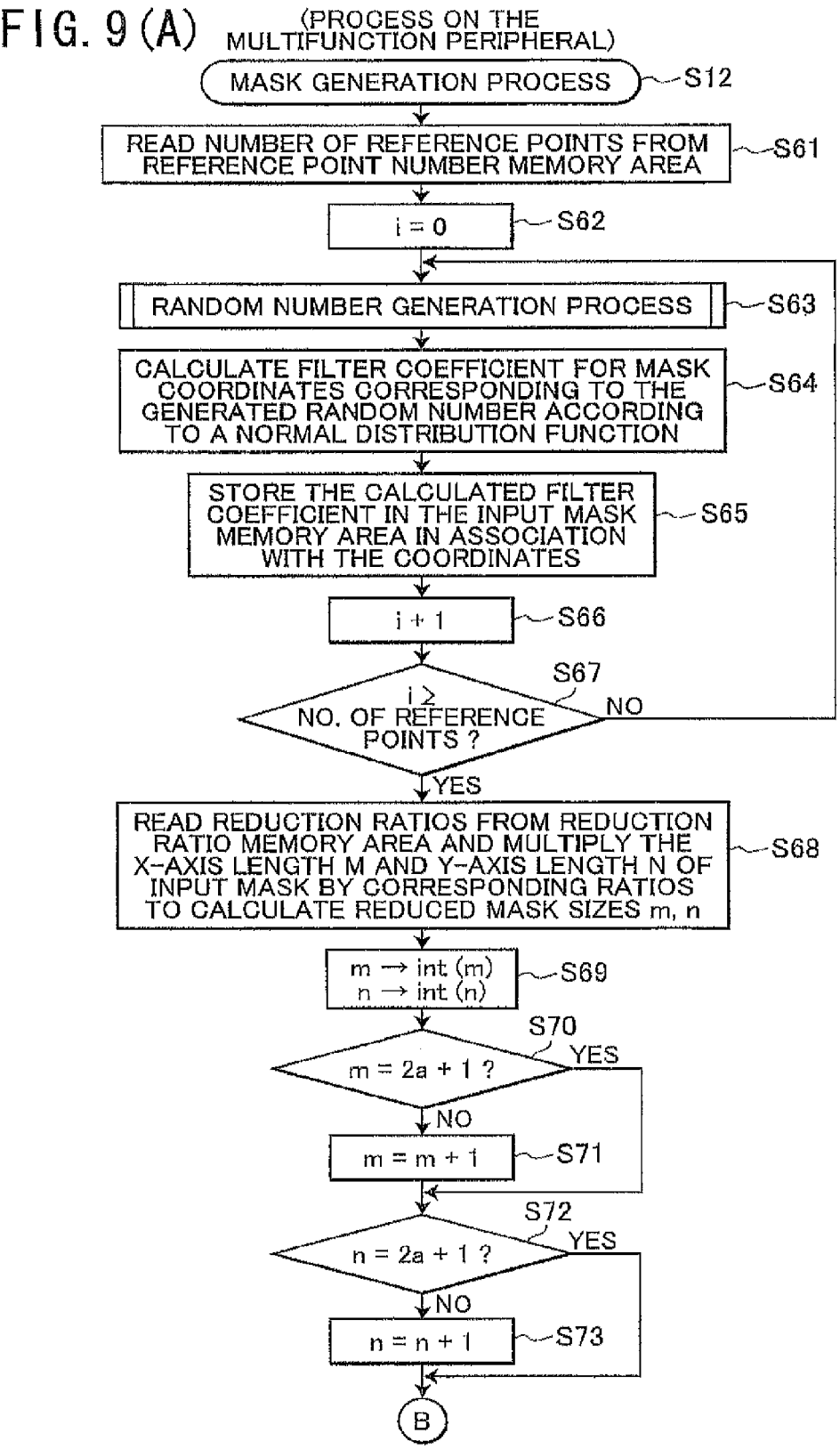

IMAGE PROCESSOR

CROSS REFERENCE TO RELATED APPLICATIONS

This application claims priority from Japanese Patent Application Nos. 2007-94493 filed Mar. 30, 2007 and 2007-94454 filed Mar. 30, 2007. The entire content of each of these priority applications is incorporated herein by reference.

TECHNICAL FIELD

The present invention relates to an image processor.

BACKGROUND

When a subject is photographed under backlit conditions, the image portion corresponding to the subject is an indistinct backlit image with low lightness and contrast, making it difficult to make out details of the subject. Image processing for enhancing image quality by improving lightness and contrast is performed on such backlit images, as well as images suffering in quality due to overexposure, underexposure, blurring due to jiggling when capturing the image, noise, insufficient lighting, and the like. One method used in conventional image processing is the Retinex process. The Retinex process primarily improves image quality in low-quality regions. In this process, an original image is separated into a reflectance component and an illumination component.

In general, the Retinex process calculates the reflectance components and illumination components from the original pixel values and calibrates the illumination components based on the reflectance components. Next, image calibration is achieved by generating output values using the calibrated illumination components and the original pixel values.

U.S. Pat. No. 6,885,482B1 discloses a method for preventing color imbalance and color slippage that can occur when performing the Retinex process independently on each RGB color plane. In this method, RGB values are converted to a coordinate space, such as YCbCr and YIQ configured of luminance and chrominance components, executing the Retinex process only on the luminance components Y, and restoring the RGB values while keeping the original chrominance components. Hence, this method prevents the occurrence of color imbalance and color slippage by correcting only the luminance component and not the chrominance components. Further, by performing the Retinex process only on the luminance component, fewer calculations are required in this method than in a method performing the Retinex process on each RGB color plane, thereby enabling the process to be performed quickly and eliminating the need to store each of the RGB values for normalizing R(x, y). Since only the luminance signal need be stored, this method reduces the amount of required storage space.

United States Patent Application Publication No. 2004/91164A1 discloses a method for achieving a fast processing speed when performing the Retinas process. In this image processing method, a reduced (low-resolution) image is formed from the original image according to the average pixel method or the like, forming an average peripheral luminance image (blurred image) by finding the average peripheral luminance for each pixel in the reduced image, forming a Retinex process image from the original image and an enlarged image of the blurred image, and forming an output image from this Retinex process image and the original image.

SUMMARY

FIG. 1 gives an overview of a conceivable Retinex process. Next, the details of the conceivable Retinex process will be described with reference to FIG. 1.

In the Retinex process, first the average intensity of peripheral pixels (peripheral pixel region) for each pixel is found in order to find a reflectance component of the each pixel (target pixel) in the original image. Peripheral pixels are pixels belonging to a region (peripheral pixel region) including and surrounding the target pixel. In other words, the peripheral pixel region includes peripheral pixels. The peripheral pixels include the target pixel and pixels that are arranged adjacent to the target pixel and that surround the target pixel. The average brightness of the peripheral pixels is found by applying weighted values to the peripheral pixels based on the distance of these pixels from the target pixel and averaging the weighted pixel values by taking the product sum of these weighted pixel values. In other words, the value of the target pixel is calibrated by reflecting the values of its peripheral pixels.

In order to find the average intensity of the peripheral pixels, an MSR (multi-scale Retinex) mask (Gaussian filter) is generated to calculate the average intensity (a). Next, the average intensity of the peripheral pixels is calculated in a Gaussian filter process performed according to Equation (1) below, with each pixel of the original image (input image) set as the target pixel (b).

The diagram (b-1) in FIG. 1 conceptually illustrates a Gaussian filter formed of an m×n matrix. The diagram (b-2) in FIG. 1 indicates filter coefficients set in the matrix constituting the Gaussian filter. In the graph (b-2) of FIG. 1, the horizontal axis denotes the position in the matrix (filter size), while the vertical axis denotes the filter coefficient. The value "0" indicated near the center of the horizontal axis is the center position of the filter. Positions farther away from "0" indicate matrix positions farther from the filter center. As shown in (b-2) in FIG. 1, the Gaussian filter is designed so that the filter coefficients grow gradually smaller in all four directions from the center.

$$\text{Average intensity of peripheral pixels} = F(x,y) * I(x,y) \quad (1)$$

Here, x denotes the horizontal coordinate, y the vertical coordinate, $I(x, y)$ the signal intensity at the coordinate $(x, y)$ (pixel value or value of the pixel signal), $F(x, y)$ the Gaussian filter, and "*" the convolution operation.

In this type of filter process, a convolution operation is performed for each pixel by aligning a target pixel in the original image undergoing the filtering process with the center of a filter, multiplying the filter coefficients (weights) stored in each element of the filter with the pixel values at corresponding positions of the original image, and calculating by the sum of these products. The filtering operation may also include an operation to divide this sum of products by the sum total of filter coefficients.

In the Gaussian filter process, a Gaussian filter $F(x, y)$ is used to perform convolution in the m×n region with each pixel of the original image set as the target pixel in order to calculate the average intensity of peripheral pixels for each pixel of the original image while weighting the peripheral pixels based on their distance from the target pixel. Since a Gaussian filter has different weighted values stored in each element of the matrix based on distance, as described above, each calculated average intensity is different from a value obtained by simply averaging each pixel value in the peripheral pixel region.

When average intensity is found, the reflectance component is found. Specifically, according to equation (2), each pixel value in the input image is divided by the corresponding average intensity calculated above, and the acquired value is converted to a logarithmic value.

$$R(x, y) \cong \ln \frac{I(x, y)}{F(x, y) * I(x, y)} \quad (2)$$

R is used to represent this logarithmic value. The logarithmic value R is found for each pixel of the original image in the above logarithmic operation (i.e., R(x, y)). The logarithmic value R found in this calculation indicates a relative brightness between the target pixel and its peripheral pixels and is equivalent to the reflectance component of the original pixel. However, this logarithmic value R must be converted to a value that can be used in a computational process and treated as a pixel value.

As shown in Equation (2), the logarithmic value R is the logarithm of the difference in pixel values between the target pixel and its peripheral pixels. In other words, the logarithmic value R represents the relative brightness of the two. Hence, the logarithmic value R is "0" if there is no difference in brightness between the target pixel and peripheral pixels. However, since the reflectance component is inserted into the denominator of a calculation in the latter part of the Retinex process, this calculation is impossible with a reflectance component of "0".

Therefore, a histogram (frequency distribution) for normalizing the logarithmic value R is created for values of R between minimum and maximum values of all logarithmic values R (d).

The histogram is subsequently corrected (e). To correct the histogram, a median value M is found from the histogram generated above, U is set to the upper limit of a range including a prescribed percentage (45%, for example) of pixels greater than the median value M, and D is set to the lower limit of a range including a prescribed percentage (45%, for example) of pixels less than the median value M.

A normalized reflectance value (normalized Retinex value) "refle" is found by normalizing the logarithmic value R (f). Specifically, the values of the upper limit U and lower limit D found above are set as a predetermined upper limit u and lower limit d, and the logarithmic values R within the range between the upper limit U and lower limit D are normalized to values within a range between the upper limit u and the lower limit d. Thus, the normalized reflectance values "refle" are calculated. This normalization is performed using equation (3), for example.

$$refle(x, y) = d + \frac{(R(x, y) - D)}{U - D} \times (u - d) \quad (3)$$

The logarithmic value R lower than the lower limit D is set as the lower limit d, and the logarithmic value R upper than the upper limit U is set as the upper limit U. By setting the lower limit d as a value greater than 0, the logarithmic value D is converted into the normalized reflectance value "refle" that is capable of being subjected to a computational process. The normalized reflectance values "refle" found above are the reflected light components of the input image (the normalized reflected light components) and serve as parameters for finding the final reflected light components (output values Out).

Next, an output value Out is calculated according to Equation (4) below. The output value Out is the value of the target pixel in the output image (output image data).

$$Out(x, y) = \frac{I(x, y)}{\left[\frac{I(x, y)}{255 \times refle(x, y)}\right]^{(1-\frac{1}{\gamma})}} \quad (4)$$

The pixel value in the Retinex process is a value combining the illumination component and the reflected light component, where the illumination component reflects luminance and the reflected light component reflects color. Since the illumination component is found by dividing the pixel value of the input image by the reflected light component, the denominator in equation (4) corresponds to the illumination component. It is noted that the pixel value of the input image is expressed as values between 0 and 255. Therefore, the normalized reflectance value "refle(x, y)" is multiplied by 255 in equation (4) to have a value that varies between 0 and 255 and therefore that can be treated as a pixel value.

Since the pixel value of the original image is divided by the illumination component in Equation (4), the resulting output value Out is the reflectance component. Because the output value Out is thus found as the reflectance component, the output value Out can serve as a pixel value representing color. As is clear from Equation (4), the calculated output value Out is a value incorporating an illumination component for which lightness and contrast have been calibrated through gamma correction.

Based on Equation (4), correlations between the pixel value in the original image and the pixel value in the output image depict a curve graph that changes according to the reflectance component (the normalized reflectance value "refle"). The function shown in Equation (4) is designed so that changes in smaller pixel values of the inputted original image, i.e., changes in pixels in dark regions, are increased (expanded) during correction and outputted as changes in the output values Out. Hence, slight changes in input values are reflected greater in the output values Out, thereby accentuating the contrast by increasing change in intensity levels. Accordingly, the Retinex process can be used to produce an output image with better image quality in backlit image areas and other low-quality image regions compared to the inputted original image.

The function shown in Equation (4) is further designed so that changes in larger pixel values, i.e., inputted pixel values in brighter regions, are decreased or compressed more as the normalized reflectance value "refle" is decreased.

In other words, the smaller the normalized reflectance value in the Retinex process, the more the output value Out is compressed as the pixel value in the input image data increases. That is, the degree, by which the output value Out is compressed as the pixel value in the input image data increases when the logarithmic value R is on the negative side, is more than the degree, by which the output value Out is compressed as the pixel value in the input image data increases when the logarithmic value R is on the positive side. In other words, for the same input value, the output value Out increases as the normalized reflectance value "refle" increases. Since the output value Out can take on a value within a wide range for the same input value according to the normalized reflectance value refle (the logarithmic value R) or a relative brightness to the peripheral pixels, it is possible to inflate changes in tone levels in the bright regions of the image and improve contrast. Since the pixel value and luminance (brightness) are connected, the luminance increases (becomes brighter) when the pixel value increases, and decreases (becomes darker) when the pixel value decreases.

It is an object of the present invention to provide an improved image processor capable of correcting an image using the Retinex process at a fast processing speed and capable of performing the Retinex process even when it is difficult to allocate the amount of memory normally required for the Retinex process.

It is another object of the present invention to provide an improved image processor capable of increasing processing speed for a filter process in the Retinex process, while ensuring that sufficient image quality can be achieved in the Retinex process.

In order to attain the above and other objects, the invention provides an image processor including: a reduced image forming unit; a reduced image peripheral average value generating unit; a reduced image reflectance component calculating unit; a frequency distribution generating unit; a representative reflectance component determining unit; a normal correcting unit; and a simplified correcting unit. The reduced image forming unit forms a reduced image by reducing an original image. The reduced image peripheral average value generating unit generates a peripheral average value for each pixel of the reduced image by performing a filtering operation on a peripheral pixel region for the each pixel, the peripheral pixel region including peripheral pixels for the each pixel, the peripheral pixels for the each pixel including the each pixel and pixels adjacent to and surrounding the each pixel. The reduced image reflectance component calculating unit calculates a reflectance component indicating a ratio of brightness between each pixel and the peripheral pixels thereof for the each pixel in the reduced image based on the results of logarithmic operations performed on the peripheral average value and the value of the each pixel in the reduced image. The frequency distribution generating unit generates a frequency distribution of the frequency of each value of reflectance component calculated by the reduced image reflectance component calculating unit. The representative reflectance component determining unit determines a representative reflectance component based on the frequency distribution. The normal correcting unit performs a normal correcting operation for correcting a value of a target pixel in the original image. The normal correcting unit includes: an original image peripheral average value generating unit; an original image reflectance component calculating unit; and a converting unit. The original image peripheral average value generating unit generates a peripheral average value for the target pixel of the original image by performing a filtering operation on a peripheral pixel region for the target pixel, the peripheral pixel region including peripheral pixels for the target pixel, the peripheral pixels for the target pixel including the target pixel and pixels adjacent to and surrounding the target pixel. The original image reflectance component calculating unit calculates a reflectance component indicating a ratio of brightness between the target pixel and the peripheral pixels thereof in the original image based on the results of logarithmic operations performed on the peripheral average value and the value of the target pixel in the original image. The converting unit converts the value of the target pixel in the original image to an output value based on the reflectance component of the target pixel and the value of the target pixel, thereby calibrating the value of the target pixel in the original image according to the ratio of brightness values between the target pixel and the peripheral pixels thereof. The simplified correcting unit performs a simplified correcting operation for correcting the value of the target pixel in the original image by converting the value of the target pixel to an output value based on the representative reflectance component and the value of the target pixel in the original image.

According to another aspect, the invention provides an image processor including: a reduced image forming unit; a reduced image peripheral average value generating unit; a reduced image reflectance component calculating unit; a frequency distribution generating unit; a representative reflectance component determining unit; and a correcting unit. The reduced image forming unit forms a reduced image by reducing an original image. The reduced image peripheral average value generating unit generates a peripheral average value for each pixel of the reduced image by performing a filtering operation on a peripheral pixel region for the each pixel, the peripheral pixel region including peripheral pixels for the each pixel, the peripheral pixels for the each pixel including the each pixel and pixels adjacent to and surrounding the each pixel. The reduced image reflectance component calculating unit calculates a reflectance component indicating a ratio of brightness between each pixel and the peripheral pixels thereof for the each pixel in the reduced image based on the results of logarithmic operations performed on the peripheral average value and the value of the each pixel in the reduced image. The frequency distribution generating unit generates a frequency distribution of the frequency of each value of reflectance component calculated by the reduced image reflectance component calculating unit. The representative reflectance component determining unit that determines a representative reflectance component based on the frequency distribution. The correcting unit corrects a value of a target pixel in the original image by converting the value of the target pixel in the original image to an output value based on the representative reflectance component and the value of the target pixel, thereby calibrating the value of the target pixel in the original image.

According to another aspect, the invention provides an image processing method including: forming a reduced image by reducing an original image; generating a peripheral average value for each pixel of the reduced image by performing a filtering operation on a peripheral pixel region for the each pixel, the peripheral pixel region including peripheral pixels for the each pixel, the peripheral pixels for the each pixel including the each pixel and pixels adjacent to and surrounding the each pixel; calculating a reflectance component indicating a ratio of brightness between each pixel and the peripheral pixels thereof for the each pixel in the reduced image based on the results of logarithmic operations performed on the peripheral average value and the value of the each pixel in the reduced image; generating a frequency distribution of the frequency of each value of the reflectance component calculated for the reduced image; determining a representative reflectance component based on the frequency distribution; performing either one of a normal correcting operation and a simplified correcting operation to correct a value of a target pixel in the original image, the performing the normal correcting operation including: generating a peripheral average value for the target pixel of the original image by performing a filtering operation on a peripheral pixel region for the target pixel, the peripheral pixel region including peripheral pixels for the target pixel, the peripheral pixels for the target pixel including the target pixel and pixels adjacent to and surrounding the target pixel; calculating a reflectance component indicating a ratio of brightness between the target pixel and the peripheral pixels thereof in the original image based on the results of logarithmic operations performed on the peripheral average value and the value of the target pixel in the original image; and converting the value of the target pixel in the original image to an output value based on the reflectance component of the target pixel and the value of the target pixel, thereby calibrating the value of the target pixel in the original image according to the ratio of brightness values between the target pixel and the peripheral pixels thereof, and the performing the simplified correcting operation including converting the value of the target pixel to an output value based on the representative reflectance component and the value of the target pixel in the original image.

According to another aspect, the invention provides a computer readable medium storing a set of program instructions executable on a data processing device, instructions including: forming a reduced image by reducing an original image; generating a peripheral average value for each pixel of the reduced image by performing a filtering operation on a peripheral pixel region for the each pixel, the peripheral pixel region including peripheral pixels for the each pixel, the peripheral pixels for the each pixel including the each pixel and pixels adjacent to and surrounding the each pixel; calculating a reflectance component indicating a ratio of brightness between each pixel and the peripheral pixels thereof for the each pixel in the reduced image based on the results of logarithmic operations performed on the peripheral average value and the value of the each pixel in the reduced image; generating a frequency distribution of the frequency of each value of the reflectance component calculated for the reduced image; determining a representative reflectance component based on the frequency distribution; performing either one of a normal correcting operation and a simplified correcting operation to correct a value of a target pixel in the original image, the performing the normal correcting operation including: generating a peripheral average value for the target pixel of the original image by performing a filtering operation on a peripheral pixel region for the target pixel, the peripheral pixel region including peripheral pixels for, the target pixel, the peripheral pixels for the target pixel including the target pixel and pixels adjacent to and surrounding the target pixel; calculating a reflectance component indicating a ratio of brightness between the target pixel and the peripheral pixels thereof in the original image based on the results of logarithmic operations performed on the peripheral average value and the value of the target pixel in the original image; and converting the value of the target pixel in the original image to an output value based on the reflectance component of the target pixel and the value of the target pixel, thereby calibrating the value of the target pixel in the original image according to the ratio of brightness values between the target pixel and the peripheral pixels thereof, and the performing the simplified correcting operation including converting the value of the target pixel to an output value based on the representative reflectance component and the value of the target pixel in the original image.

According to another aspect, the invention provides an image processing method, including: forming a reduced image by reducing an original image; generating a peripheral average value for each pixel of the reduced image by performing a filtering operation on a peripheral pixel region for the each pixel, the peripheral pixel region including peripheral pixels for the each pixel, the peripheral pixels for the each pixel including the each pixel and pixels adjacent to and surrounding the each pixel; calculating a reflectance component indicating a ratio of brightness between each pixel and the peripheral pixels thereof for the each pixel in the reduced image based on the results of logarithmic operations performed on the peripheral average value and the value of the each pixel in the reduced image; generating a frequency distribution of the frequency of each value of the reflectance component calculated for the reduced image; determining a representative reflectance component based on the frequency distribution, and correcting a value of a target pixel in the original image by converting the value of the target pixel in the original image to an output value based on the representative reflectance component and the value of the target pixel, thereby calibrating the value of the target pixel in the original image.

According to another aspect, the invention provides a computer readable medium storing a set of program instructions executable on a data processing device, instructions including: forming a reduced image by reducing an original image; generating a peripheral average value for each pixel of the reduced image by performing a filtering operation on a peripheral pixel region for the each pixel, the peripheral pixel region including peripheral pixels for the each pixel, the peripheral pixels for the each pixel including the each pixel and pixels adjacent to and surrounding the each pixel; calculating a reflectance component indicating a ratio of brightness between each pixel and the peripheral pixels thereof for the each pixel in the reduced image based on the results of logarithmic operations performed on the peripheral average value and the value of the each pixel in the reduced image; generating a frequency distribution of the frequency of each value of the reflectance component calculated for the reduced image; determining a representative reflectance component based on the frequency distribution; and correcting a value of a target pixel in the original image by converting the value of the target pixel in the original image to an output value based on the representative reflectance component and the value of the target pixel, thereby calibrating the value of the target pixel in the original image.

According to another aspect, the invention provides an image processor including: an original image mask storing unit; a reduced image mask generating unit, a reduced image forming unit; a reduced image peripheral average value generating unit; a reduced image reflectance component calculating unit; a frequency distribution generating unit; a normalization parameter setting unit; an original image peripheral average value generating unit; an original image reflectance component calculating unit; a normalizing unit; and a converting unit. The original image mask storing unit stores an original image mask in a form of a two-dimensional matrix having filter coefficients. The reduced image mask generating unit generates a reduced image mask based on the original image mask and based on a size ratio of an original image and a reduced image. The reduced image forming unit forms a reduced image by reducing the original image at the size ratio. The reduced image peripheral average value generating unit generates a peripheral average value for each pixel of the reduced image by performing a filtering operation by using the reduced image mask on a peripheral pixel region for the each pixel, the peripheral pixel region including peripheral pixels for the each pixel, the peripheral pixels for the each pixel including the each pixel and pixels adjacent to and surrounding the each pixel. The reduced image reflectance component calculating unit calculates a reflectance component indicating a ratio of brightness between each pixel and the peripheral pixels thereof for the each pixel in the reduced image based on the results of logarithmic operations performed on the peripheral average value and the value of the each pixel in the reduced image. The frequency distribution generating unit generates a frequency distribution of the frequency of each value of reflectance component calculated by the reduced image reflectance component calculating unit. The normalization parameter setting unit sets a normalization parameter based on the frequency distribution. The original image peripheral average value generating unit generates a peripheral average value for the target pixel of the original image by performing a filtering operation by using the original image mask on a peripheral pixel region for the target pixel, the peripheral pixel region including peripheral pixels for the target pixel, the peripheral pixels for the target pixel including the target pixel and pixels adjacent to and surrounding the target pixel. The original image reflectance component calculating unit calculates a reflectance component indicating a ratio of brightness between the target pixel and the peripheral pixels thereof in the original image based on the results of logarithmic operations performed on the peripheral average value and the value of the target pixel in the original image. The normalizing unit normalizes the reflectance component for the target pixel based on the normalization parameter. The converting unit converts the value of the target pixel in the original image to an output value based on the normalized reflectance component of the target pixel and the value of the target pixel, thereby calibrating the value of the target pixel in the original image according to the ratio of brightness values between the target pixel and the peripheral pixels thereof.

According to another aspect, the invention provides an image processing method, including: generating a reduced image mask based on an original image mask and based on a size ratio of an original image and a reduced image, the original image mask being in a form of a two-dimensional matrix having filter coefficients; forming a reduced image by reducing the original image at the size ratio; generating a peripheral average value for each pixel of the reduced image by performing a filtering operation by using the reduced image mask on a peripheral pixel region for the each pixel, the peripheral pixel region including peripheral pixels for the each pixel, the peripheral pixels for the each pixel including the each pixel and pixels adjacent to and surrounding the each pixel; calculating a reflectance component indicating a ratio of brightness between each pixel and the peripheral pixels thereof for the each pixel in the reduced image based on the results of logarithmic operations performed on the peripheral average value and the value of the each pixel in the reduced image; generating a frequency distribution of the frequency of each value of the reflectance component calculated for the reduced image; setting a normalization parameter based on the frequency distribution; generating a peripheral average value for the target pixel of the original image by performing a filtering operation by using the original image mask on a peripheral pixel region for the target pixel, the peripheral pixel region including peripheral pixels for the target pixel, the peripheral pixels for the target pixel including the target pixel and pixels adjacent to and surrounding the target pixel; calculating a reflectance component indicating a ratio of brightness between the target pixel and the peripheral pixels thereof in the original image based on the results of logarithmic operations performed on the peripheral average value and the value of the target pixel in the original image; normalizing the reflectance component for the target pixel based on the normalization parameter; and converting the value of the target pixel in the original image to an output value based on the normalized reflectance component of the target pixel and the value of the target pixel, thereby calibrating the value of the target pixel in the original image according to the ratio of brightness values between the target pixel and the peripheral pixels thereof.

According to another aspect, the invention provides a computer readable medium storing a set of program instructions executable on a data processing device, instructions including: generating a reduced image mask based on an original image mask and based on a size ratio of an original image and a reduced image, the original image mask being in a form of a two-dimensional matrix having filter coefficients; forming a reduced image by reducing the original image at the size ratio; generating a peripheral average value for each pixel of the reduced image by performing a filtering operation by using the reduced image mask on a peripheral pixel region for the each pixel, the peripheral pixel region including peripheral pixels for the each pixel, the peripheral pixels for the each pixel including the each pixel and pixels adjacent to and surrounding the each pixel; calculating a reflectance component indicating a ratio of brightness between each pixel and the peripheral pixels thereof for the each pixel in the reduced image based on the results of logarithmic operations performed on the peripheral average value and the value of the each pixel in the reduced image; generating a frequency distribution of the frequency of each value of the reflectance component calculated for the reduced image; setting a normalization parameter based on the frequency distribution; generating a peripheral average value for the target pixel of the original image by performing a filtering operation by using the original image mask on a peripheral pixel region for the target pixel, the peripheral pixel region including peripheral pixels for the target pixel, the peripheral pixels for the target pixel including the target pixel and pixels adjacent to and surrounding the target pixel; calculating a reflectance component indicating a ratio of brightness between the target pixel and the peripheral pixels thereof in the original image based on the results of logarithmic operations performed on the peripheral average value and the value of the target pixel in the original image; normalizing the reflectance component for the target pixel based on the normalization parameter; and converting the value of the target pixel in the original image to an output value based on the normalized reflectance component of the target pixel and the value of the target pixel, thereby calibrating the value of the target pixel in the original image according to the ratio of brightness values between the target pixel and the peripheral pixels thereof.

DETAILED DESCRIPTION

Figure 1:
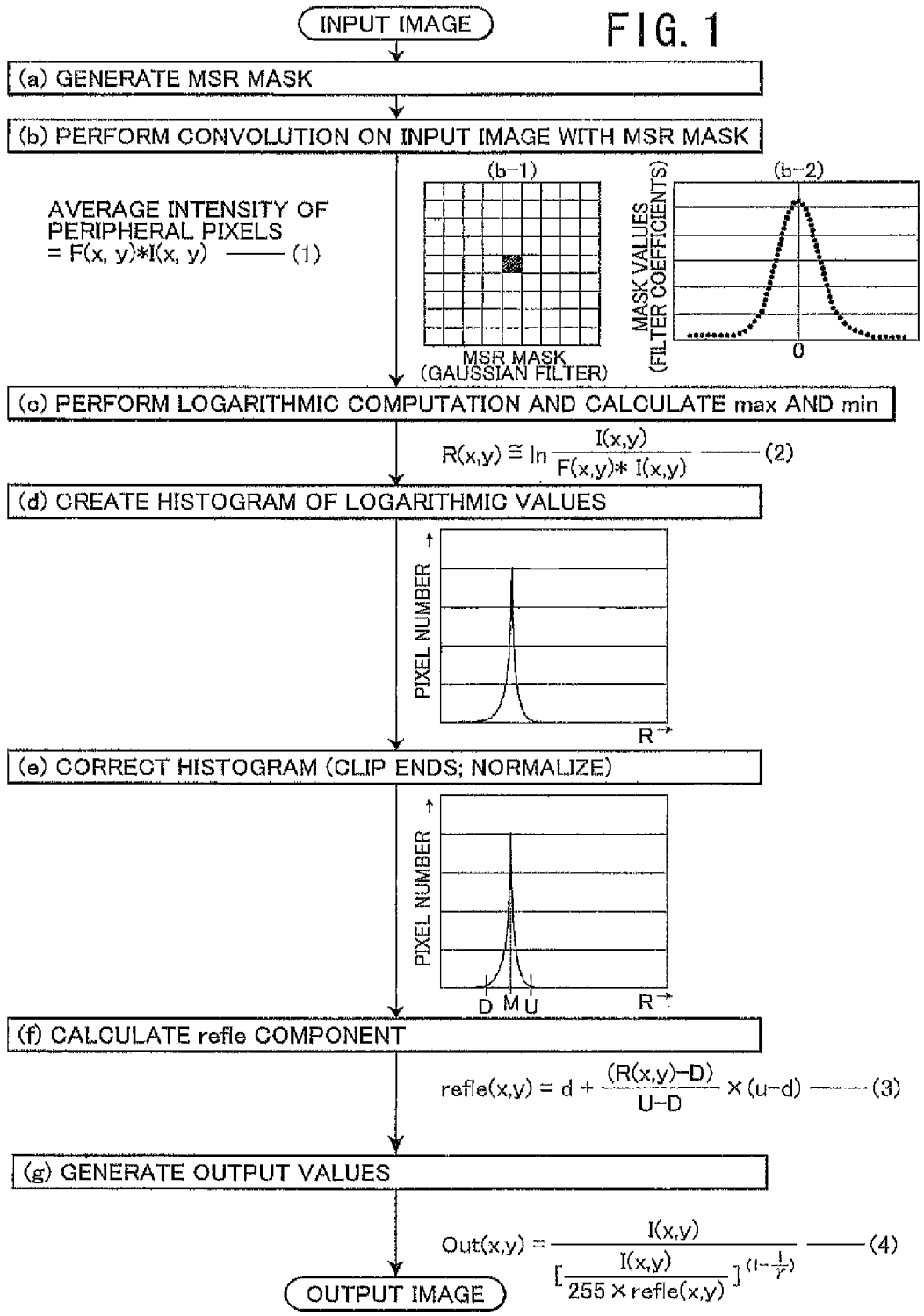
FIG. 1 is an explanatory diagram showing an overview of a conceivable Retinex process.

An image processor according to embodiments of the invention will be described while referring to the accompanying drawings wherein like parts and components are designated by the same reference numerals to avoid duplicating description.

First Embodiment

First, a first embodiment of the present invention will be described while referring to FIGS. 2-7.

Figure 2:
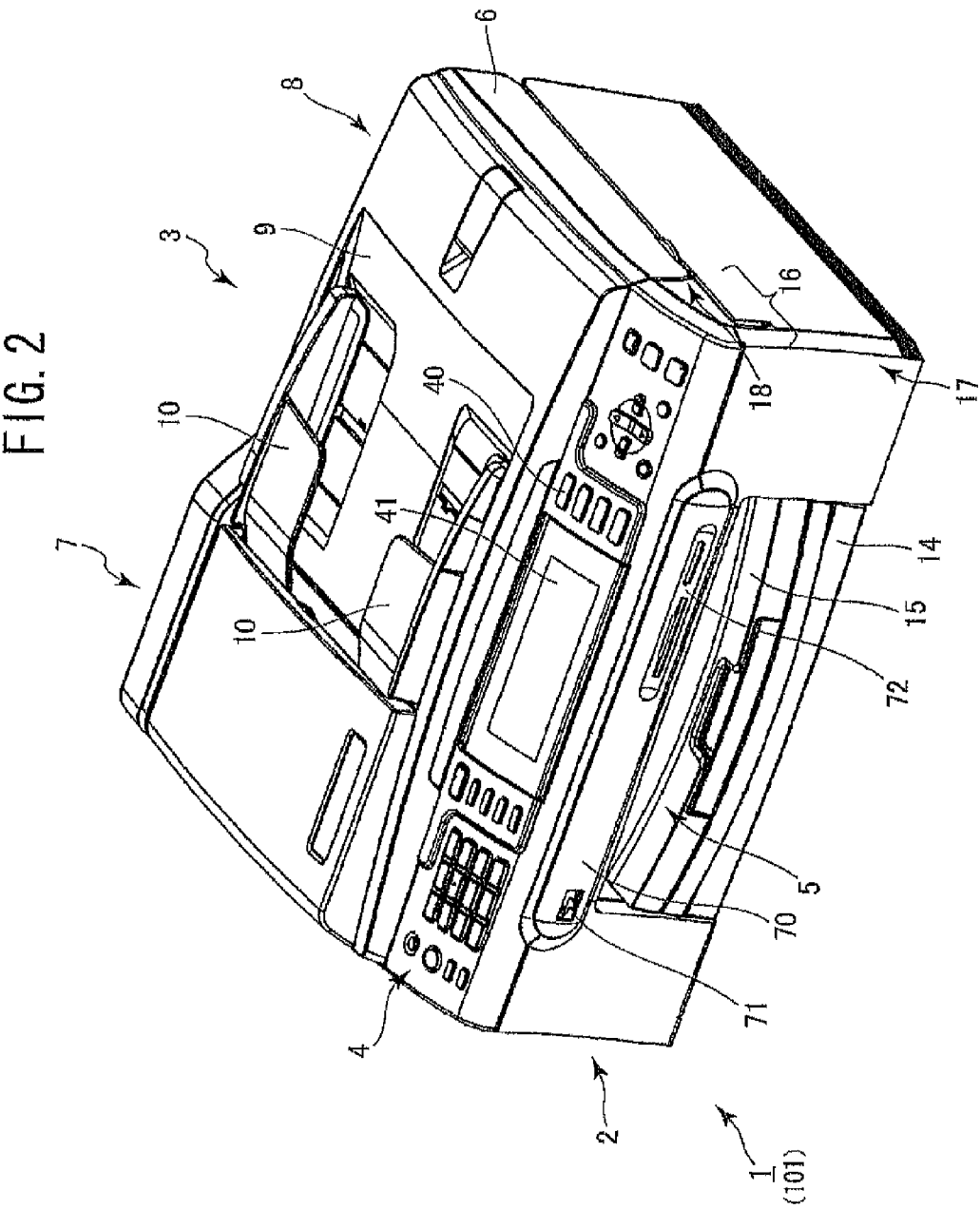
FIG. 2 is a perspective view of a multifunction peripheral according to a first embodiment of the present invention.

FIG. 2 is a perspective view showing the external structure of a multifunction peripheral (MFP) 1 according to the first embodiment.

As shown in FIG. 2, the MFP 1 is integrally provided with a printer 2 disposed in a lower section thereof, a scanner 3 disposed in an upper section, and a control panel 4 disposed on the front surface of the scammer 3. The MFP 1 implements a plurality of functions, including a copier function, a facsimile function, and a printer function for recording data received from an external computer (not shown), such as a personal computer (hereinafter abbreviated as "PC"), on recording paper.

The scanner 3 includes a document scanning bed 6 giving the scanner 3 a flatbed scanner function, and a document cover 8 rotatably attached to the document scanning bed 6 via hinges provided on the rear side. The document cover 8 includes an automatic document feeder (hereinafter abbreviated as "ADF") 7. The document scanning bed 6 has a rectangular-shaped platen glass disposed in a top surface thereof, and an image-reading unit (not shown) built into the interior of the document scanning bed 6.

The interior of the document scanning bed 6 includes space in which the image-reading unit can move, space for disposing the image-reading unit or a member for supporting the image-reading unit and a mechanism for driving the image-reading unit. Although the top surface of the document scanning bed 6 is formed larger than the platen glass, the document scanning bed 6 is similar in shape to the platen glass in a plan view (i.e., a rectangular shape elongated laterally in a plan view).

When using the scanner 3 having this construction as a flatbed scanner, the user opens the document cover 8, places an original document on the platen glass, and subsequently closes the document cover 8 to fix the document in place. When the user inputs a command to begin scanning, the image-reading unit scans the document along the underside surface of the platen glass, thereby reading images from the original document.

The image-reading unit is provided with a line image sensor having a main scanning direction aligned with the depth dimension of the MFP 1, the line image sensor functioning to scan an image by irradiating light from a light source onto an original document, guiding light reflected from the original document to a photoelectric converting element via lenses, and outputting an electric signal from the photoelectric converting element based on the intensity of reflected light. The line image sensor may be configured of a contact image sensor (CIS), a charge coupled device (CCD), or a complementary metal-oxide semiconductor (CMOS).

The ADF 7 conveys a document G from a document tray 9 to a document discharge tray 10 through a document conveying path. In a conveying process of the document by the ADF 7, the document passes on a reading surface on the document reading unit 6, and an image of the document G is read out by the image reading unit waiting below the reading surface. Such image reading by the ADF 7 is carried out with the document cover 8 covering the document reading unit 6. In this embodiment, the ADF 7 can be configured arbitrarily. For example, the scanner 3 may be a flatbed scanner having no ADF 7.

The printer 2 is an image-recording device for recording images on recording paper based on image data scanned by the scanner 3 or image data inputted externally. As described above, the printer 2 is disposed below the scanner 3. The printer 2 and scanner 3 are arranged flush on the rear side so that the rear surface of the MFP 1 is flat with no protrusions. While the printer 2 is configured of an inkjet printer employing an inkjet system as the image-recording system in the first embodiments the printer 2 may employ one of a variety of image-recording systems, such as an electrophotographic system or a thermal transfer system.

An opening 5 is formed in the front surface of the MFP 1, and specifically in the front surface of the printer 2. A paper tray 14 and a discharge tray 15 are disposed in the opening 5 so as to be completely accommodated therein. The paper tray 14 and discharge tray 15 are arranged in two levels vertically, with the discharge tray 15 disposed on top and the paper tray 14 on the bottom.

As described above, the document scanning bed 6 has a rectangular shape elongated laterally. The front surface of the printer 2 is an endface 17 that protrudes from an endface 18 on the front surface of the scanner 3 by a prescribed distance. The portion of the printer 2 protruding forward of the endface 18 will be referred to as a protruding part 16. The printer 2 is formed with a width matching the width of the scanner 3. Hence, the MFP 1 is substantially square-shaped in a plan view.

A U-shaped paper-conveying path is formed in the printer 2, extending upward from the innermost depth of the paper tray 14 and curving to connect with the discharge tray 15. Recording paper accommodated in the paper tray 14 is fed into the paper-conveying path with a short side as the leading edge and is conveyed along the U-shaped path to an image-recording position provided in the middle of the path. An image is recorded on the recording paper at the image-recording position. Subsequently, the paper is discharged onto the discharge tray 15.

A connection panel 70 is provided in the printer 2 above the opening 5. The connection panel 70 has a USB terminal 71 on the left side thereof. The USB terminal 71 is a connector enabling the MFP 1 to be connected to an external device via a USB cable so that the external device and the MFP 1 can communicate with each other. The connection panel 70 also has a slot section 72 on the right side thereof. The slot section 72 includes a plurality of card slots in which memory cards can be mounted. A control unit 20 described later (see FIG. 3) can read image data from a memory card mounted in one of the slots.

The control panel 4 is provided on the front surface of the MFP 1 and has a rectangular shape elongated laterally to match the space above the protruding part 16. In other words, the control panel 4 has a depth that falls within the distance obtained by subtracting the depth of the scanner 3 from the depth of the printer 2. The control panel 4 enables the user to control the printer 2 and scanner 3 and is provided with operating keys 40 and a liquid crystal display (LCD) 41. The user can input desired commands using the control panel 4. After the user inputs a desired command into the MFP 1, the control unit 20 controls the operations of the MFP 1 based on the inputted data.

A feature of the MFP 1 according to the first embodiment is that the operating keys 40 include various mode keys, such as a Copy mode key and a Fax mode key. The user operates these mode keys to select one of the modes. When the user selects the copy mode, the scanner 3 reads image data from an original document, and the printer 2 records the image data. When the user selects the fax mode, the scanner 3 reads image data from an original document and transmits the image data to another facsimile device via a communication line.

The MFP 1 is configured to operate based not only on commands inputted via the control panel 4, but also commands transmitted from a PC or other computer connected to the MFP 1 via a printer driver, scanner driver, or the like.

As shown in FIG. 2, the LCD 41 has the largest possible height dimension that can be accommodated in the control panel 4 and a width dimension greater than four-thirds the height dimension. In other words, the ratio of width to height of the LCD 41 is set greater than 4/3. In this example, the ratio of width to height is 8/3.

Figure 3:
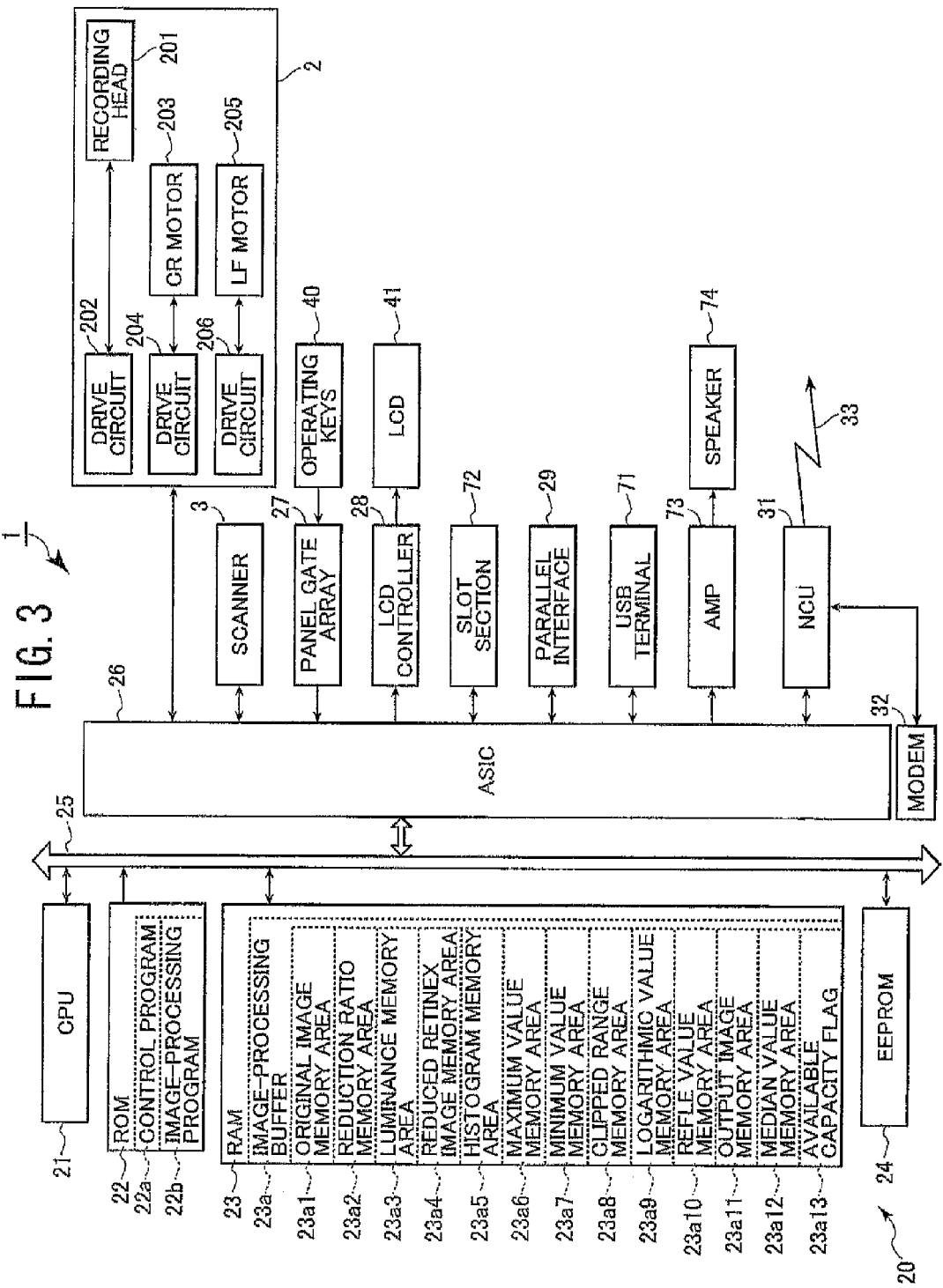
FIG. 3 is a block diagram showing the electrical structure of the multifunction peripheral.

FIG. 3 is a block diagram showing the electrical structure of the MFP 1 having the above configuration. The MFP 1 includes a parallel interface 29 capable of connecting the MFP 1 to a PC via a cable, the USB terminal 71 capable of connecting the MFP 1 to a digital camera, and the slot section 72 for detachably inserting external media (storage media configured of flash memory, such as memory cards). With this configuration, image data can be inputted into the MFP 1 from a PC digital camera, or external media. The MFP 1 is also configured to perform image processing using the Retinex process (image calibration) on inputted image data.

The control unit 20 controls the overall operations of the MFP 1, including the printer 2, scanner 3, and control panel 4. As shown in FIG. 3, the control unit 20 is configured of a microcomputer primarily having a central processing unit (CPU) 21, a read-only memory (ROM) 22, a random access memory (RAM) 23, and an electrically erasable and programmable ROM (EEPROM) 24, all of which are connected to an application specific integrated circuit (ASIC) 26 via a bus 25.

Figure 5:
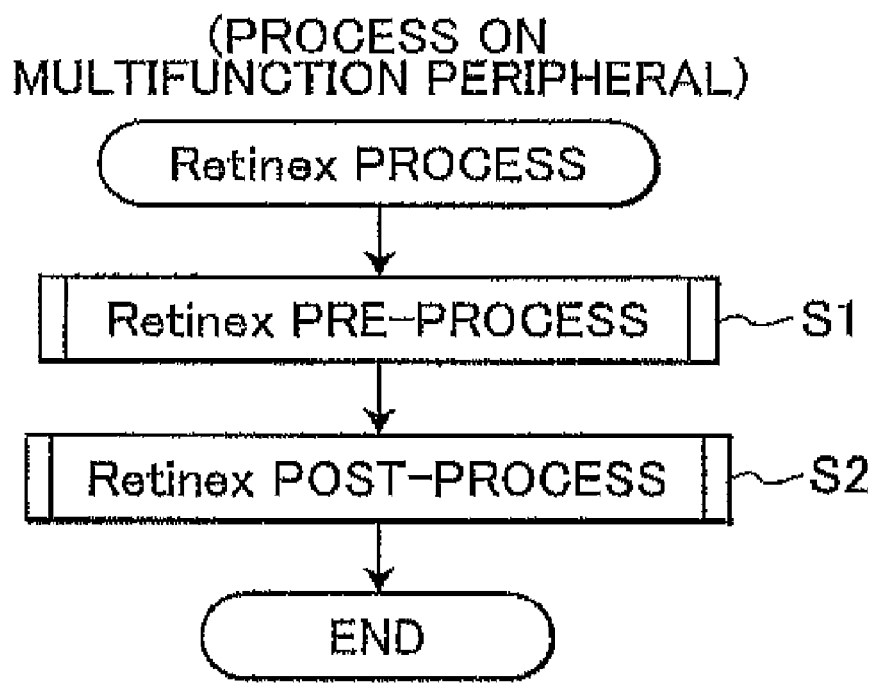
FIG. 5 is a flowchart illustrating steps in a Retinex process performed on the multifunction peripheral according to an image-processing program.
Figure 6:
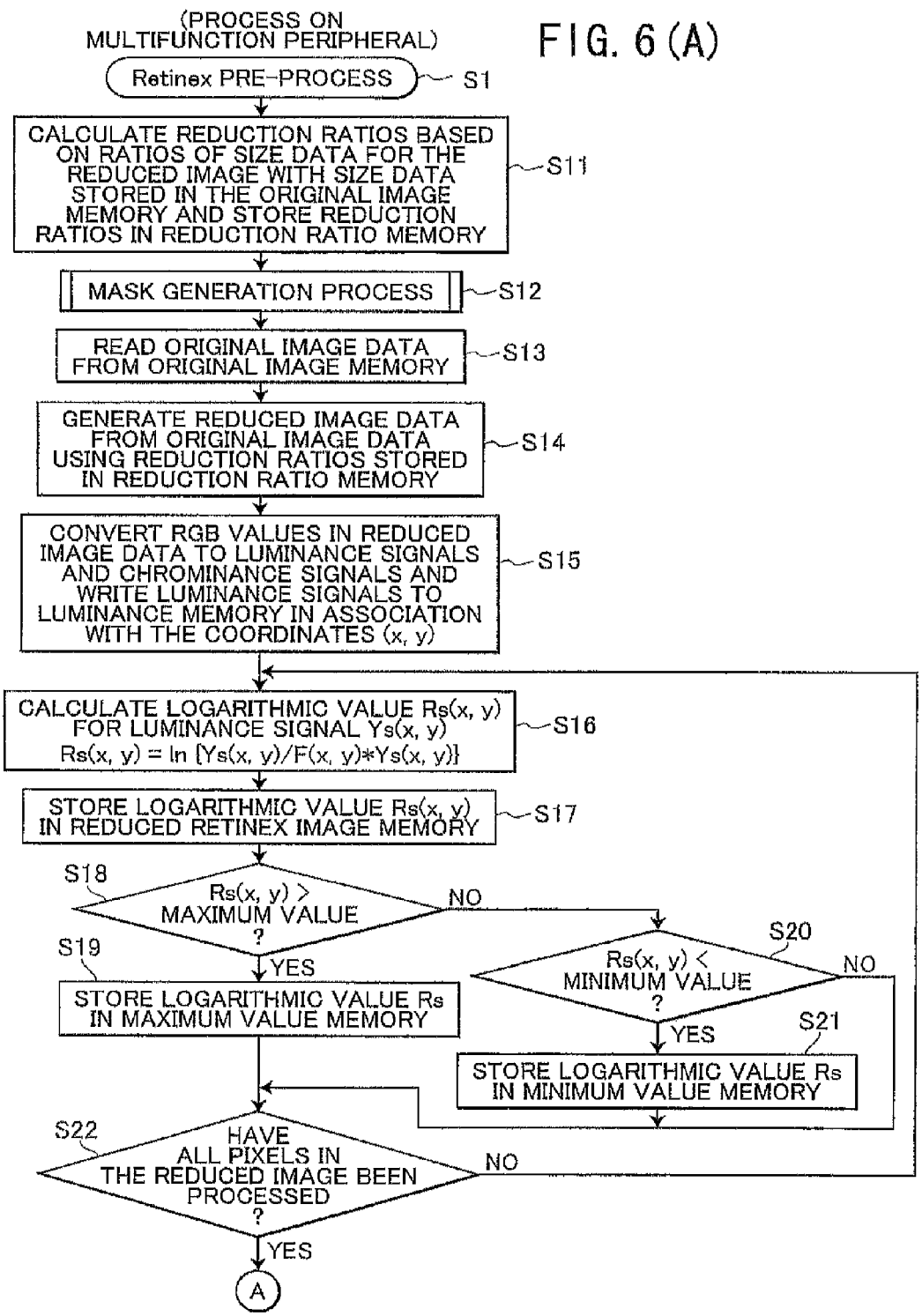
FIG. 6(A) is a flowchart illustrating a part of steps in a Retinex pre-process executed during the Retinex process of FIG. 5.
FIG. 6(B) is a flowchart illustrating a remaining part of steps in the Retinex pre-process.
Figure 7:
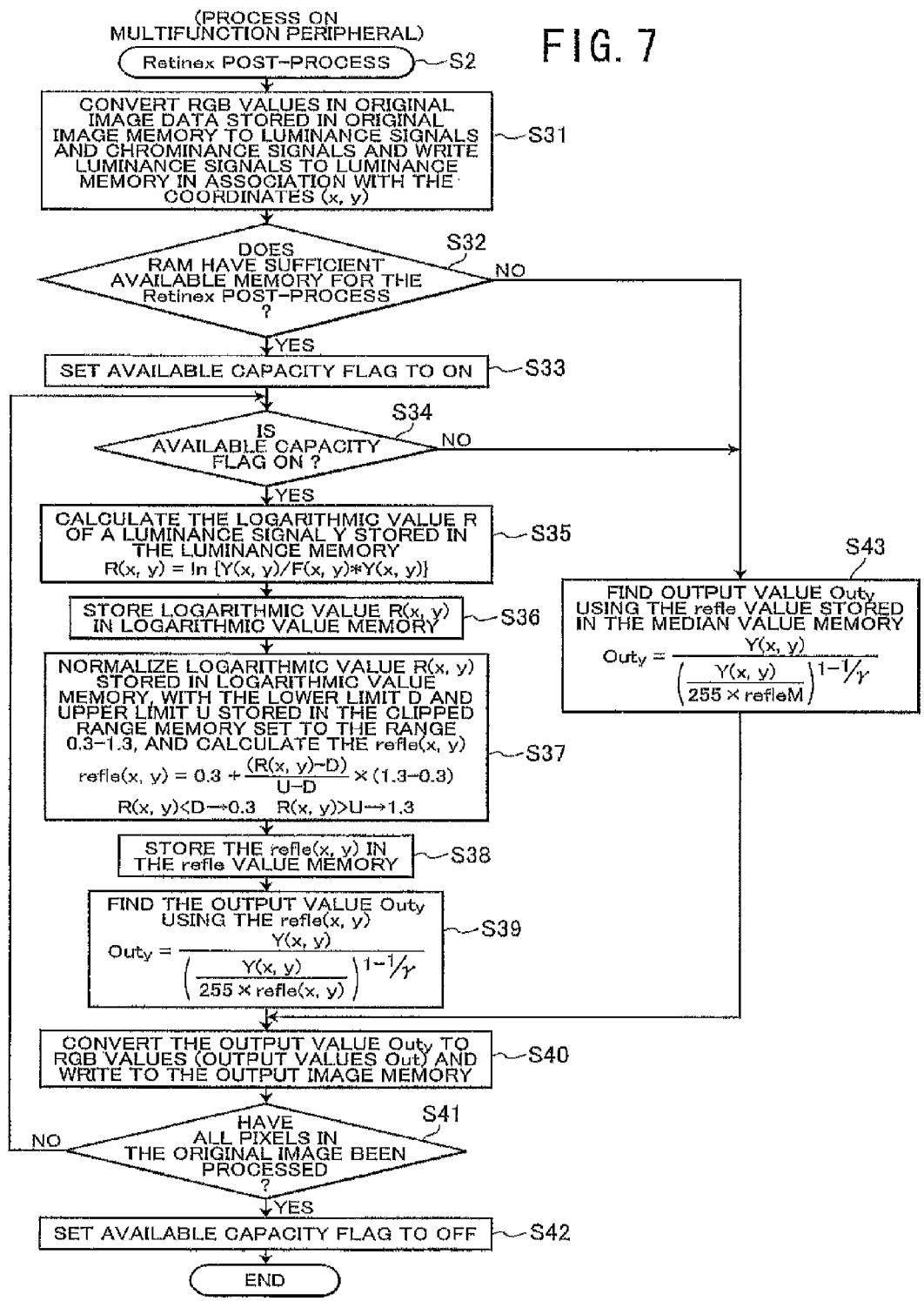
FIG. 7 is a flowchart illustrating steps in a Retinex post-process executed during the Retinex process of FIG. 5.

The CPU 21 performs overall control of the MFP 1. The ROM 22 stores various control programs executed by the CPU 21, fixed values used by the CPU 21 when executing these programs, and the like. The ROM 22 includes a control program 22a for implementing a copier operation, printer operation, facsimile operation, and the like; and an image-processing program 22b for performing image processing, such as the Retinex process. The image-processing program 22b is used to execute the Retinex process on original image data inputted from a PC, digital camera, or external media via the parallel interface 29, USE terminal 71, and slot section 72, respectively. Through this Retinex process, the image-processing program 22b can produce output image data by correcting backlit regions or other low-resolution regions in the image data. The program illustrated by flowcharts in FIGS. 5 through 7 is stored in the ROM 22 as part of the image-processing program. It is noted that the MFP 1 may be provided with a hard disk or the like, and the image-processing program 22b may be originally stored in a data storage medium such as a CD-ROM, and downloaded to the hard disk. The image-processing program 22b may be downloaded to the hard disk from the network such as the Internet.

It is also noted that in the present embodiment, in the Retinex process, both of an original image and a reduced image (to be described later) is subjected to filtering operation by using Gaussian filters. The Gaussian filter used for the original image will be referred to as an input mask, and the Gaussian filter used for the reduced image will be referred to as a reduced mask, hereinafter.

The RAM 23 is a rewritable memory that the CPU 21 uses as a storage area or work area for temporarily storing various data used when executing the above programs. The RAM 23 includes allocated regions of a fixed size, including a loading area for loading programs designated to be read when the MFP 1 is started up and programs for the main process, and an area for storing fixed values and the like required in the main process; and a variable region dynamically assigned to programs being executed. When a program is executed, memory regions required for the program operations (storage area and work area) are allocated in the available variable region (unused region).

When a program is executed, generally the program issues a request to the CPU 21 to allocate memory within a range from a minimum amount to a maximum amount of memory required for program operations. If there is sufficient available memory, the CPU 21 allocates the memory area required for implementing the program within the requested range. When two or more programs are executed in parallel, the memory region allocated to each program may vary within the requested minimum and maximum range according to conditions.

The CPU 21 allocates memory regions dynamically, constricting memory regions allocated for programs that are currently running when a new program is started and expanding memory regions allocated to currently running programs when a program ends operations, for example.

When performing image processing, the CPU 21 allocates a memory area required for executing the image-processing program 22b in the RAM 23 as an image-processing buffer 23a. Of course, if the amount of memory area available is less than the amount required for implementing the program, the CPU 21 cannot allocate the necessary memory area and the program cannot be executed.

The image-processing buffer 23a includes an original image memory area 23a1, a reduction ratio memory area 23a2, a luminance memory area 23a3, a reduced Retinex image memory area 23a4, a histogram memory area 23a5, a maximum value memory area 23a6, a minimum value memory area 23a7, a clipped range memory area 23a8, a logarithmic value memory area 23a9, a refle value memory area 23a10, an output image memory area 23a11, a median value memory area 23a12, and an available capacity flag 23a13. In the following description, "s" is appended to variables concerned with a reduced image and is not appended to variables concerned with an original image.

The original image memory area 23a1 serves to store original image data prior to image processing. The original image data stored in the original image memory area 23a1 is inputted into the printer 2 from a PC, digital camera, or external media via the respective parallel interface 29, USB terminal 71, or slot section 72. When new image data is inputted into the MFP 1, the original image data currently stored in the original image memory area 23a1 is updated with the inputted image data. Size data indicating the size of the image is also added to the original image data and stored in the original image memory area 23a1.

The original image data in this example is configured of raster data having pixel values (signal intensity values or RGB values) for each pixel forming the original image. In the embodiment, the original image data and output image data are configured of RGB values, each of which is a value in the range 0-255.

Specifically, the RGB values include components representing the three primary colors of light, i.e. an R value representing red, a G value representing green, and a B value representing blue. The combination of RGB values for each pixel of an input image indicates one color (hue, toner etc.). The greater the RGB values, the higher the luminance (brightness).

Rather than performing the Retinex process directly on this original image data (RGB values), the MFP 1 in the embodiment is configured to execute the Retinex process after converting RGB values in the original image data to luminance signals Y. Hence, the MFP 1 can maintain the color balance of the original image in the processed output image better than when performing the Retinex process on each of the RGB values.

The reduction ratio memory area 23a2 stores a reduction ratio used for creating the reduced image from the original image. When performing the Retinex process on original image data, the MFP 1 finds parameters for normalizing the reflectance values found from the original image (logarithmic values R) from reflectance values in the reduced image (logarithmic values Rs). Hence, it is necessary to form the reduced image. The amount of memory required for finding the logarithmic values Rs and the amount of memory for storing the calculated logarithmic values Rs is decreased for smaller sizes of the reduced images. However, since image precision is also decreased as the reduced image is decreased, the parameters found for the logarithmic values Rs are inaccurate. In other words, there is a lower limit to the reduced image size capable of producing accurate parameters. Therefore, the smallest possible size of the reduced image that can produce accurate parameters is the optimum size. The MFP 1 sets the size of the reduced image to a predetermined fixed size equivalent to this optimum size.

However, while the size of the reduced image is fixed, the size of the inputted original image can be set arbitrarily by the user. Therefore, the reduction ratio must be modified based on the size of the original image in order to form the reduced image at the fixed size. Accordingly, the reduction ratio is calculated and stored in the reduction ratio memory area 23a2 each time original image data is inputted (each time image processing is performed on a different original image).

The reduction ratio is derived from the ratio of the original image size and the reduced image size, i.e., the ratio of size data added to the original image data and known size data for the reduced image. The size data includes the number of pixels in the image along the X-axis and the number of pixels along the Y-axis. Since the number of pixels along the X-axis and the Y-axis are generally different in an image, the MFP 1 finds a reduction ratio between the original image and reduced image for the number of pixels along the long side and a reduction ratio for the number of pixels along the short side. Both reduction ratios are stored in the reduction ratio memory area 23a2. The MFP 1 forms the reduced image by reducing the original image based on both the reduction ratios along the X-axis and the reduction ratio along the Y-axis.

The luminance memory area 23a3 is for storing, for each pixel, a luminance signal Y and chrominance signals Cr and Cb that are calculated based on RGB values and on the following formula (5):

$$\begin{pmatrix} Y \\ C_r \\ C_b \end{pmatrix} = \begin{pmatrix} 0.30 & 0.59 & 0.11 \\ 0.51 & -0.43 & -0.08 \\ -0.17 & -0.34 & 0.51 \end{pmatrix} \begin{pmatrix} R \\ G \\ B \end{pmatrix} \quad (5)$$

As described above, the MFP 1 does not perform the Retinex process directly on original image data (RGB values) for the inputted original image, but performs the Retirnex process after converting the RGB values to luminance signals Y. The luminance signal Y converted from RGB values is stored in the luminance memory area 23a3 in association with the coordinates (x, y) for the source RGB values. The MFP 1 generates reflectance values and output values $Out_y$ based on the luminance signals Y or Ys stored in the luminance memory area 23a3.

In order to generate the output values $Out_y$ of the output image, the MFP 1 calculates reflectance values (logarithmic values Rs and R) from both the reduced image and the original image. When calculating reflectance values, the MFP 1 generates the luminance signals Ys or Y from RGB values for the source image data (reduced image data or original image data) and writes these values to the luminance memory area 23a3. The MFP 1 first generates the luminance signals Ys for the reduced image and stores these luminance signals Ys in the luminance memory area 23a3. When the MFP 1 subsequently generates the luminance signals Y for the original image, the MFP 1 resets the luminance signals Ys stored in the luminance memory area 23a3 to 0 and stores the luminance signals Y newly generated from the RGB values of the original image data in the luminance memory area 23a3.

The luminance signal Y and chrominance signals Cb and Cr are computed from RGB values using Equation (5). However, since the RGB values are within the predetermined range 0-255, the luminance signal Y also actually falls within the predetermined range 0-255. According to the present embodiment, therefore, by substituting the luminance signal Y(x, y) or a luminance signal Ys(x, y) for the signal intensity I(x, y) in Equation (4), a Retinex-processed luminance signal Y (luminance signal Ys) is produced as an output value $Out_y$.

The reduced Retinex image memory area 23a4 functions to store reflectance values (reflectance components or logarithmic values Rs) that are found from the luminance signals Ys of the reduced image.

The original image is compressed according to a method well known in the art, such as the nearest neighbor method for sampling a value of a pixel nearest a position of the original image corresponding to a pixel of the reduced image and for using the sampled pixel value, or the bi-cubic method or average pixel method for performing interpolation using pixels surrounding a position in the original image corresponding to a pixel of the reduced image. The nearest neighbor method is used when processing speed is given priority over image quality, and the bi-cubic method or average pixel method is used when giving priority to image quality over processing speed.

Through any of these methods, the original image is reduced at the reduction ratios stored in the reduction ratio memory area 23a2, and the logarithmic value Rs is calculated for each pixel of the reduced image using Equation (2) and stored in the reduced Retinex image memory area 23a4 in association with the corresponding coordinates (x, y) of the pixel. Values stored in the reduced Retinex image memory area 23a4 are updated when a new calibration process is executed. It is noted that the logarithmic value Rs is calculated by substituting the luminance signal Ys(x, y) for the signal intensity I (x, y) in equation (2). More specifically, the logarithmic value Rs for each pixel in the reduced image is found using the Gaussian filter (reduced mask) to calculate an average luminance by performing convolution operations with the Gaussian filter F(x, y) in a m×n region with the subject pixel set as the target pixel and by subsequently taking the natural logarithm of a value obtained by dividing the luminance signal Ys in the reduced image by the computed average luminance. It is noted that the reduced mask is formed of an m×n matrix, wherein m×n number of elements are arranged in m columns and in n rows, wherein m and n are both integers (odd, values) greater than one. In other words, the reduced mask has a X-axis length m and a Y-axis length n.

The histogram memory area 23a5 stores results of tabulating the number of pixels having the same reflectance level for the reflectance values (logarithmic values Rs) stored in the reduced Retinex image memory area 23a4. The histogram memory area 23a5 is provided with a memory area corresponding to each reflectance level in order to store a tallied result that is obtained by tallying the number of pixels having the logarithmic value of the subject level Rs. Hence, the histogram memory area 23a5 functions to form a histogram of logarithmic values Rs.

The CPU 21 sets the number of memory areas in the histogram memory area 23a5 and the level of the logarithmic value Rs managed in each area when a new original image is inputted into the MFP 1. Specifically, after the logarithmic value Rs is found for all pixels constituting the reduced image, the CPU 21 determines a range for producing a histogram based on maximum and minimum values of logarithmic values Rs and selects a range of levels to be tabulated (managed levels), thereby setting the number of areas in the histogram memory area 23a5 and the level of the logarithmic value Rs for each area.

After determining to which level a logarithmic value Rs stored in the reduced Retinex image memory area 23a4 belongs, the CPU 21 increments the value stored in the area corresponding to the determined level of the logarithmic value Rs. In this way, the CPU21 tabulates the number of pixels for each level.

The maximum value memory area 23a6 and minimum value memory area 23a7 store a maximum value and minimum value, respectively, of the logarithmic values Rs stored in the reduced Retinex image memory area 23a4, which values are used for generating the histogram. A value of 0 is written to the maximum value memory area 23a6 and minimum value memory area 23a7 at the beginning of the Retinex process. After each logarithmic value Rs is calculated and stored in the reduced Retinex image memory area 23a4, the calculated logarithmic value Rs is compared with the value stored in the maximum value memory area 23a6. If the new logarithmic value Rs is larger than the value stored in the maximum value memory area 23a6, then the maximum value memory area 23a6 is updated to reflect the new value.

Further, when the newly calculated logarithmic value Rs is smaller than the value stored in the maximum value memory area 23a6, this logarithmic value Rs is compared with the value stored in the minimum value memory area 23a7. If the newly calculated logarithmic value Rs is smaller than the value stored in the minimum value memory area 23a7, then the minimum value memory area 23a7 is updated to reflect the new value.

As a result of this process, the maximum value memory area 23a6 saves the maximum value of logarithmic values Rs stored in the reduced Retinex image memory area 23a4, and the minimum value memory area 23a7 stores the minimum value of logarithmic values Rs stored in the reduced Retinex image memory area 23a4.

The CPU 21 references the maximum and minimum values stored in the maximum value memory area 23a6 and minimum value memory area 23a7 when generating the histogram and determines the range for generating the histogram based on these maximum and minimum values.

The clipped range memory area 23a8 stores a clipped range found from the histogram, and more specifically stores a lower limit D and an upper limit U determined based on tallying results in the histogram memory area 23a5. The upper limit U indicates a point greater than a median value M detected from the tallied results (frequency distribution) stored in the histogram memory area 23a5 so that the number of pixels existing in the range between the median value M and the upper limit U is equal to 45% of the total number of the pixels in the reduced image. The lower limit D indicates a point less than the median value M so that the number of pixels existing in the range between the median value M and the lower limit D is also equal to 45% of the total number of the pixels in the reduced image. It is noted that about a half of the entire pixels in the reduced image has the logarithmic values Rs greater than or equal to the median value M, and about a remaining half of the entire pixels in the reduced image has the logarithmic values Rs smaller than or equal to the median value M. It is noted that generally, when a histogram of logarithmic values R is generated for an image, the histogram has a peak at the median value M as shown in (e) of FIG. 1. So, the median value M generally serves as a most frequently appearing value in the histogram of the logarithmic value Rs.

The range from the lower limit D to the upper limit U is set as the clipped range. The logarithmic value R of the original image data that fall within this clipped range are normalized to a predetermined range between a lower limit d and an upper limit u, producing normalized reflectance values "refle". Hence, the lower limit D and the upper limit U are parameters for normalizing the logarithmic values R of the original image data.

Since the MFP 1 can determine the clipped range for the original image based on the histogram formed from the reduced image, it is possible to reduce the processing time required for determining this clipped range by not generating a histogram of reflectance value for all pixels in the original image.

The median value memory area 23a12 stores a median-value-corresponding normalized reflectance value "refleM" for the median value M of the logarithmic value Rs in the histogram stored in the histogram memory area 23a5. After forming the histogram, the MFP 1 normalizes the logarithmic value Rs (median value M) found from the histogram, based on the clipped range stored in the clipped range memory area 23a8 and stores the median-value-corresponding normalized reflectance value "refleM" in the median value memory area 23a12.

Since the MFP 1 is capable of performing copying operations, printing operations, and facsimile operations, often one of these operations is performed in parallel with image processing. In a copying operation, the MFP 1 controls the scanner 3 based on the control program 22a. In the printing operation, the MFP 1 controls a recording head 201 and the like provided in the printer 2 described later based on the control program 22a. In a facsimile operation, received data is sequentially stored in the MFP 1. It is noted that most multifunction peripherals are designed to give priority to a copying operation, printing operation, and facsimile operation over image processing. Accordingly, the multifunction peripherals give priority to allocating memory in a RAM required for control in the copying operation, printing operation, and facsimile operation (for controlling the related mechanisms), reducing (restricting) the amount of memory that can be assigned to other processes. As a result, the memory required for performing a Retinex process often cannot be allocated in the RAM.

Contrarily, according to the present embodiment, by saving the median-value-corresponding normalized reflectance value "refleM" for the median value of the logarithmic value Rs derived from the reduced image in the median value memory area 23a12, the MFP 1 can perform a simplified Retinex process using the median-value-corresponding normalized reflectance value "refleM", even when the amount of memory that can be allocated in the RAM 23 is insufficient to perform the normal Retinex process. Hence, when it is not possible to perform the normal Retinex process, image correction according to Equation (4) is performed for each pixel using the median-value-corresponding normalized reflectance value "refleM" stored in the median value memory area 23a12 in place of the normalized reflectance value "refle" derived from the each pixel of the original image data. Since normalized reflectance values "refle" are not generated from the original image in this correction, the MFP 1 need not generate logarithmic values R that use a lot of memory in order to execute the Retinex process. Therefore, the MFP 1 can avoid cases, in which image correction is impossible, by executing the simplified Retinex process, even under conditions in which it is difficult to allocate the amount of memory required for the normal Retinex process.

Often a large amount of memory is necessary for developing image data into dot data (bitmap data) in a RAM, particularly when a printer is executing a printing operation. Further, a large amount of memory must be allocated for controlling the operations of a recording head. Hence, conventional multifunction peripherals frequently have been unable to perform image processing (the Retinex process) in parallel with a printing operation. However, since the MFP 1 of the present embodiment performs the simplified Retinex process when it is not possible to perform the Retinex process on the original image (normal Retinex process; post-process) due to the large amount of memory area required, the MFP 1 can perform image processing in parallel with a printing operation.

The logarithmic value memory area 23a9 functions to store logarithmic values R, which are reflectance values calculated from the original image data. More specifically, the CPU 21 uses the luminance signal Y for the original image data stored in the luminance memory 23a3 to calculate the logarithmic value R(x, y) corresponding to each pixel according to equation (2) described above and stores the calculated logarithmic value R(x, y) in the logarithmic value memory area 23a9 in association with its coordinates. Values in the logarithmic value memory area 23a9 are updated with logarithmic values R newly calculated each time a new Retinex process is executed. The logarithmic value R is calculated by substituting a luminance signal Y(x, y) for the signal intensity I(x, y) in equation (2). More specifically, as with Rs, the logarithmic value R for each pixel in the original image is found using the Gaussian filter (input mask) to calculate an average luminance by performing convolution operations with the Gaussian filter F(x, y) in a M×N region with the subject pixel set as the target pixel and by subsequently taking the natural logarithm of a value obtained by dividing the luminance signal Y in the original image by the computed average luminance. It is noted that the input mask is formed of an M×N matrix, wherein N×N number of elements are arranged in M columns and in N rows, wherein N and N are both integers (odd values) greater than one. In other words, the reduced mask has a X-axis length M and a Y-axis length N.

The refle memory area 23a10 functions to store a normalized reflectance value "refle" obtained by normalizing the logarithmic value R stored in the logarithmic value memory area 23a9. The normalized reflectance value "refle" stored in the refle memory area 23a10 is produced by normalizing the logarithmic value R(x, y) stored in the logarithmic value memory area 23a9 to a value within a range from a lower limit d (=0.3) to an upper limit u (=1.3) according to equation (3) for the clipped range stored in the clipped range memory area 23a8. A normalized reflectance value refle(x, y) is generated for each logarithmic value R(x, y) and written to the refle memory area 23a10 in association with the coordinates (x, y). The MFP 1 reads the normalized reflectance value "refle" from the refle memory area 23a10 when generating the output value $Out_y$ and generates the output value $Out_y$ by using the normalized reflectance value "retle".

When executing a printing operation or displaying a preview image, it is necessary to normalize the logarithmic values R (or logarithmic values Rs) in order to generate output values $Out_y$. The logarithmic values R (or logarithmic values Rs) are normalized to satisfy the following two conditions. The first condition is that the normalized reflectance values "refle" obtained through normalization must not include the value 0 to avoid cases in which the output values $Out_y$ cannot be calculated, as described above.

The second condition is that the normalized reflectance values "refle" should have a width of 1. When the normalized reflectance values refle have a width of 1, it is possible to set the dynamic range of the output image substantially the same as the dynamic range of the original image. Since the pixel values of the original image fall within the range from 0 to 255, pixel values for the output image within the same range of 0-255 can be obtained by setting the width of the normalized reflectance values "refle" to 1, preventing an overall change in color tone in the output image compared with the input image.

Accordingly, the logarithmic values R (or logarithmic values Rs) are normalized to values within a range from the lower limit d, which is a value greater than 0, and the upper limit u found by adding 1 to the lower limit d. In the embodiment, the lower limit d in equation (3) is set to 0.3 and the upper limit u to 1.3 so that the logarithmic values R (or logarithmic values Rs) are normalized to values within 0.3-1.3. In other words, the normalized reflectance value "refle" of each pixel in the original image (or the reduced image) is set to a value between 0.3 and 1.3. When the logarithmic values R (or logarithmic values Rs) are normalized to the range 0.3-1.3, the normalized reflectance value "refle" for a logarithmic value R of 0 is 0.8. Hence, the target pixel has a positive logarithmic value R (or Rs) when the normalized reflectance value "refle" exceeds 0.8, indicating that the target pixel is brighter than its peripheral pixels, and has a negative logarithmic value R (or Rs) when the normalized reflectance value "refle" is less than 0.8, indicating that the target pixel is darker than its peripheral pixels.

Since the gamma coefficient is an arbitrary constant, equation (4) for calculating the output value Out in the Retinex process has two variables (parameters), specifically the luminance signal Y or Ys and the normalized reflectance value "refle". Hence, by calculating the normalized reflectance value "refle", it is possible to calculate an output value $Out_y$ corresponding to each luminance signal Y or Ys in the range of 0-255.

The output image memory area 23a11 functions to store output image data, i.e, output image data that is corrected through Retinex process. The output image data is to be outputted to the printer 2. The output image data stored in the output image memory area 23a11 includes output values Out generated from the original image according to the Retinex process (the correction process) and is configured of RGB values for each pixel forming the output image. As described above, the output value $Out_y$ corresponding to the luminance signal Y(x, y) of the original image is generated, and the output value $Out_y$ is converted to RGB values according to equation (6) shown below to obtain the output values Out.

$$\begin{pmatrix} R \\ G \\ B \end{pmatrix} = \begin{pmatrix} 1.0 & 0 & 1.37 \\ 1.0 & -0.34 & -0.70 \\ 1.0 & 1.73 & 0 \end{pmatrix} \begin{pmatrix} Y \\ C_b \\ C_r \end{pmatrix} \quad (6)$$

The MFP 1 calculates one output value $Out_y$(x, y) for each luminance signal Y(x, y) of the original image, and generates one set of output values Out(x, y) corresponding to each output value $Out_y$(x, y). The MFP 1 writes the output values Out(x, y) generated above in the output image memory area 23a11 in association with the coordinates. When executing a printing operation, the MFP 1 reads the output values Out (output image data) from the output image memory area 23a11 and outputs this data to the printer 2. After outputting the output values Out to the printer 2, the values are deleted from the output image memory area 23a11.

The available capacity flag 23a13 is used to indicate whether the RAM 23 has a sufficient amount of available memory for performing the normal Retinex process on the original image. In a Retinex post-process described later with reference to FIG. 7, the CPU 21 checks the available memory in the RAM 23 before performing the Retinex process on the original image and sets the available capacity flag 23a13 to ON if the RAM 23 has sufficient available memory for performing this normal Retinex process (i.e., for generating the logarithmic values R, calculating normalized, reflectance values "refle" by normalizing the logarithmic values R, and generating output values $Out_y$ and output values Out using the calculated normalized reflectance values refle). The CPU 21 sets the available capacity flag 23a13 to OFF if the RAM 23 does not have sufficient memory for performing the normal Retinex process on the original image. When beginning the Retinex process, the CPU 21 determines based on the setting of the available capacity flag 23a13 whether the normal Retinex process can be performed on the original image and executes the normal Retinex process if the available capacity flag 23a13 is ON. However, if the available capacity flag 23a13 is OFF, the CPU 21 does not generate the logarithmic values R from the original image data and does not generate the normalized reflectance values "refle" from the logarithmic values R, but generates output values $Out_y$ using the median-value-corresponding normalized reflectance value "refleM" stored in the median value memory area 23a12.

A panel gate array 27 is also connected to the ASIC 26, which is connected to the control unit 20 via the bus 25. The panel gate array 27 controls the operating keys 40 through which the user inputs desired commands into the MFP 1. Specifically, the panel gate array 27 detects input when the operating keys 40 are pushed and outputs the corresponding code signals. Key codes are assigned to each of the plurality of operating keys 40. Upon receiving prescribed key codes from the panel gate array 27, the CPU 21 executes the corresponding control process based on a prescribed key process table. This key process table lists key codes in correspondence with their control processes and is stored in the ROM 22, for example.

An LCD controller 28 is also connected to the ASIC 26 for controlling the screen display on the LCD 41. The LCD controller 28 displays data on the screen of the LCD 41 related to operations of the printer 2 and scanner 3 based on commands from the CPU 21. The LCD controller 28 also displays on the LCD 41 an image corresponding to data scanned by the scanner 3 or an image corresponding to data received from an external device connected to the MFP 1 or data extracted from a memory card inserted into the slot section 72.

A network control unit (NCU) 31 connected to a common public line 33 for implementing the facsimile function is also connected to the ASIC 26. A modem 32 is connected to the ASIC 26 via the NCU 31. A network interface (not shown) may also be provided for exchanging data with computers on the network. The MFP 1 may also be provided with a telephone function for implementing a telephone call by connecting a handset to the NCU 31.

An amp 73 is also connected to the ASIC 26. The amp 73 produces sounds on a speaker 74 connected to the amp 73 in order to output ringtones, error tones, messages, and the like.

The printer 2 connected to the ASIC 26 is configured of an inkjet printer that includes the recording head 201, a carriage motor (CR motor) 203, a line feed motor (LF motor) 205, and drive circuits 202, 204, and 206.

The recording head 201 prints on a recording paper by ejecting ink through a plurality of nozzles formed in a nozzle surface. The recording head 201 is counted on a carriage (not shown) and is configured to reciprocate in a direction orthogonal to the conveying direction of the recording paper. The drive circuit 202 applies a drive pulse having a waveform conforming to a signal outputted from a gate array (not shown) to drive elements corresponding to each of the nozzles in the recording head 201. The recording head 201 is activated by the drive pulse signal outputted from the drive circuit 202 and ejects ink in response to this signal.

The CR motor 203 drives the carriage in a reciprocating motion. The drive circuit 204 applies a voltage to the CR motor 203. When the CR motor 203 is driven by a voltage outputted from the drive circuit 204, the CR motor 203 operates pulleys, for example, connected thereto in order to move the carriage, and thus the recording head 201, in a reciprocating direction orthogonal to the conveying direction of the recording paper.

The LF motor 205 functions to convey the recording paper. The drive circuit 206 applies a voltage to the LF motor 205. When the LF motor 205 is driven by a voltage outputted from the drive circuit 206, the LF motor 205 drives a feeding roller, conveying roller, and the like coupled with the LF motor 205 in order to convey recording paper along the U-shaped paper conveying path connecting the rear sides of the paper tray 14 and discharge tray 15.

If the printer 2 of the MFP 1 has an electrophotographic system, a photosensitive unit is provided in place of the recording head 201, and a motor for rotating the photosensitive unit is provided in place of the CR motor 203.

Figure 4:
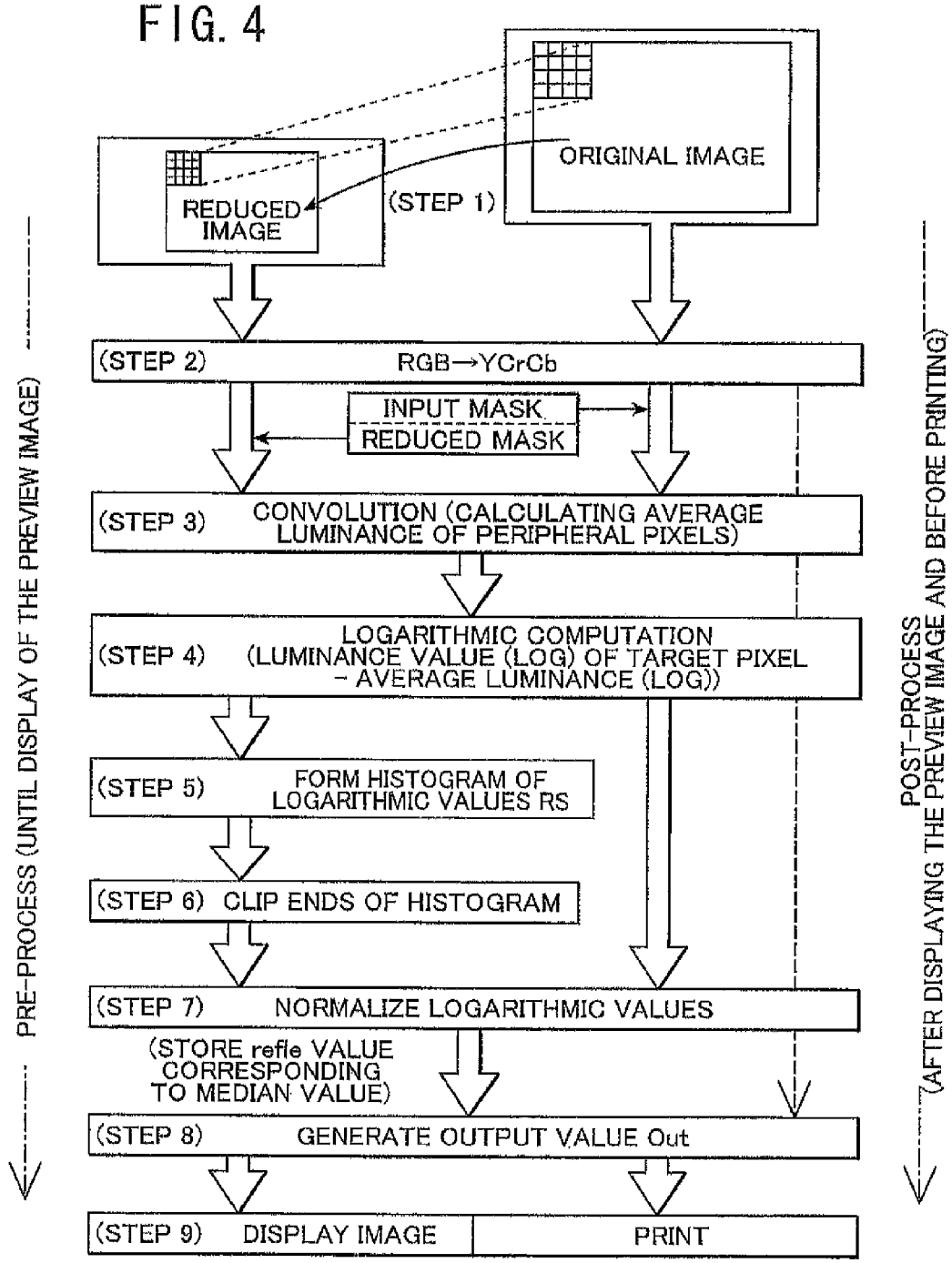
FIG. 4 is an explanatory diagram conceptually illustrating the flow of a Retinex process performed on the multifunction peripheral.

Next, the Retinex process executed on the MFP 1 having the above construction will be described with reference to FIG. 4 and the flowcharts in FIGS. 5 through 7. FIG. 4 conceptually illustrates the flow of the Retinex process performed on the MFP 1.

FIG. 5 is a flowchart illustrating steps in the Retinex process executed on the MFP 1. In S1 at the beginning of the Retinex process, the CPU 21 performs a Retinex pre-process for reducing the original image, setting a clipped range for normalizing the reflectance values (logarithmic values) R of the original image based on the reduced image, and displaying a preview image. In S2 the CPU 21 executes a Retinex post-process in which the Retinex process is performed on the original image. Subsequently, the CPU 21 ends the Retinex process. The printer 2 prints the original image data calibrated in the Retinex post-process of S2.

Hence, the Retinex process performed on the MFP 1 includes the pre-process for performing a Retinex process on the reduced image, and a post-process for performing a Retinex process on the original image. In FIG. 4, the Retinex pre-process of S1 is indicated on the left side of the drawing, and the Retinex post-process of S2 is indicated on the right side.

Figure 6B:
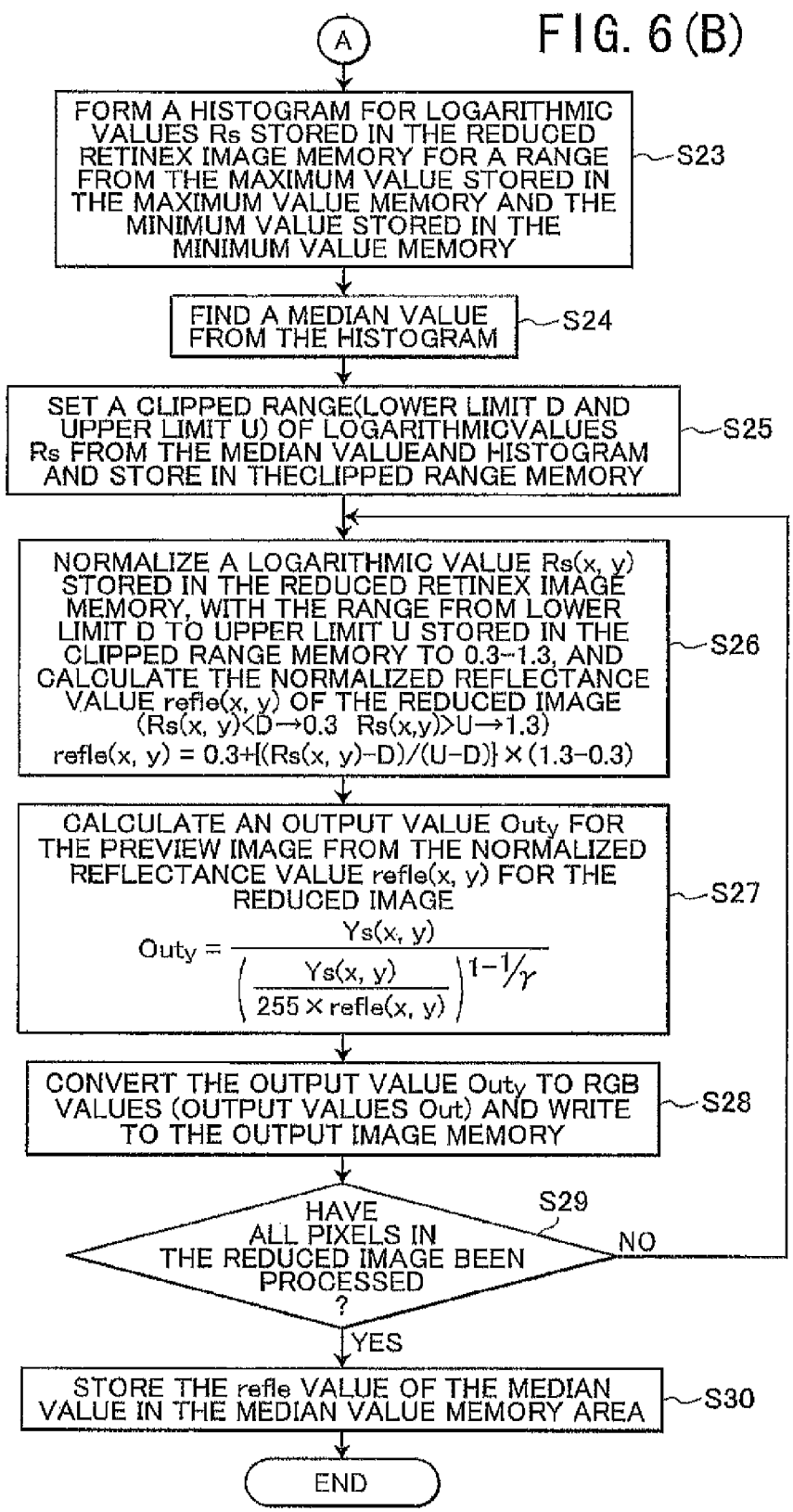

FIGS. 6(A) and 6(B) show a flowchart illustrating steps in the Retinex pre-process of S1 executed during the Retinex process of FIG. 5. As shown in FIG. 4, the Retinex pre-process of S1 involves forming a reduced image from an original image (Step 1), generating luminance signals Ys from the RGB values of the reduced image (Step 2), performing convolution operations (filtering operations using the Gaussian filter (reduced mask)) for calculating average luminance values (Step 3), calculating logarithmic values Rs using the average luminance values (Step 4), forming a histogram from the logarithmic values Rs (Step 5), clipping the ends of the histogram (Step 6), normalizing the logarithmic values Rs (Step 7), generating output values Out (Step 8), and displaying a preview image as the output step (Step 9).

More specifically, in S11 of the Retinex pre-process shown in FIG. 6(A), the CPU 21 calculates a reduction ratio for each of the X-axis and Y-axis based on the ratio of the size data for the reduced image (number of pixels in the reduced image along the long side and short side) and the size data of the original image (number of pixels in the original image along the long side and short side) stored in the original image memory area 23a1 (attached to the original image data) and stores the computed reduction ratios in the reduction ratio memory area 23a2. In this example, the X-axis is set as the long side and the Y-axis as the short side. Accordingly, the ratio of long sides in the original image and reduced image is set as the reduction ratio on the X-axis, and the ratio of short sides in these images is set as the reduction ratio on the Y-axis.

In S12 the CPU 21 performs a mask generation process to generate the input mask and reduced mask (Gaussian filters) to be used in filtering operations (convolution operations) on the reduced image and original image.

The input mask and reduced mask are generated to have substantially the same size ratio as the size ratio of the original image and the reduced image. That is, the ratio of m relative to M is substantially equal to the reduction ratio for the X-axis stored in the reduction ratio memory area 23a2, and the ratio of n relative to N is substantially equal to the reduction ratio for the Y-axis stored in the reduction ratio memory area 23a2.

Each of the input mask and the reduced mask is generated by setting a filter coefficient: F (x,y) to each of all the elements in the following manner: The filter coefficient for the center element is equal to "1", and filter coefficients for other elements gradually decrease away from the center element in all directions according to a normal distribution function.

In S13 the CPU 21 reads original image data from the original image memory area 23a1 and in S14 generates reduced image data by reducing the original image data based on reduction ratios stored in the reduction ratio memory area 23a2 (see Step 1 in FIG. 4). It is noted that prior to performing the Retinex pre-process of S1, the original image data inputted from an external source is stored in the original image memory area 23a1 either when the data was inputted or according to a prescribed process executed in response to a user command.

In S15 the CPU 21 converts, for each pixel, RGB values in the reduced image data generated in S14 to a luminance signal Ys and chrominance signals Cb and Cr (see Step 2 of FIG. 4), and writes the luminance signal Ys to the luminance memory area 23a3 in association with the coordinates (x, y) of the corresponding RGB values. Through this process, luminance signals Ys corresponding to all pixels in the reduced image are stored in the luminance memory area 23a3.

In S16 the CPU 21 calculates, for one pixel, a reflectance value (logarithmic value Rs) based on the luminance signal Ys of the reduced image stored in the luminance memory area 23a3. Specifically, the CPU21 calculates the logarithmic value Rs(x, y) for the pixel (x, y) by substituting the luminance signal Ys(x, y) for the signal intensity I(x, y) in equation (2). More specifically, the CPU 21 performs convolution with the Gaussian filter F(x, y) on an m×n region of the reduced image Ys(x, y) including a target pixel at coordinates (x, y) (filtering operations with using reduced mask (see Step 3 of FIG. 4)), to find an average luminance value of peripheral pixels, averaged while applying weight to the peripheral pixels based on their distance from the target pixel. The CPU 21 then calculates a logarithmic value Rs(x, y), which is the reflectance value of the target pixel, by dividing the luminance signal Ys(x, y) of the target pixel with the average luminance value and by finding a natural logarithm of a resultant value (see Step 4 of FIG. 4). It is noted that the Gaussian filter used in S16 is the reduced mask that is generated in the mask generation process (S12).

In S17 the CPU 21 stores the logarithmic value Rs(x, y) calculated in S16 in the reduced Retinex image memory area 23a4 and in S18 determines whether the logarithmic value Rs(x, y) is greater than the value stored in the maximum value memory area 23a6. If the logarithmic value Rs(x, y) is greater than the value stored in the maximum value memory area 23a6 (S18: YES), then in S19 the CPU 21 overwrites the value stored in the maximum value memory area 23a6 with the new logarithmic value Rs(x, y). However, if the logarithmic value Rs(x, y) is smaller than the value stored in the maximum value memory area 23a6 (S18: NO), then in S20 the CPU 21 determines whether the logarithmic value Rs is smaller than the value stored in the minimum value memory area 23a7. If the logarithmic value Rs is smaller than the value stored in the minimum value memory area 23a7 (S7: YES), then in S21 the CPU 21 overwrites the value stored in the minimum value memory area 23a7 with the new logarithmic value Rs.

After completing the process in S19 or S21, the CPU21 determines in S22 whether the process has been completed for all pixels in the reduced image. In this way, the CPU21 repeats the process in S16-S22 for each target pixel (each luminance signal Ys) until the process has been completed for all luminance signals Ys in order to generate the logarithmic values Rs for all the pixels in the reduced image and to determine maximum and minimum values of the logarithmic values Rs. Hence, a luminance signal Ys is read from the luminance memory area 23a3 each time the process in S16-S22 is executed in an order conforming to the coordinates (the order of a raster scan from the first coordinates to the last coordinates). When the CPU21 determines in S22 that the process has been completed for all pixels (S22: YES), in S23 the CPU21 forms a histogram for the logarithmic values Rs stored in the reduced Retinex image memory area 23a4 within a range from the maximum value stored in the maximum value memory area 23a6 to the minimum value stored in the minimum value memory area 23a7. (See Step 5 in FIG. 4)

In S24 the CPU 21 finds the median value M from the histogram formed in S23 and in S25 sets a clipped range of logarithmic values Rs (upper limit U and lower limit D) from the median value M and the histogram, and stores upper limit U and lower limit D in the clipped range memory area 23a8. Specifically, the CPU21 sets the upper limit U to the logarithmic value Rs at an upper point of a range that is greater than the median value M and that includes 45% of the pixels, sets the lower limit D to the logarithmic value Rs at a lower point of a range that is less than the median value M and that includes 45% of the pixels, and sets the clipped range to the range between the lower limit D and the upper limit U including 45% of the pixels both greater than and less than the median value M. Hence, the ends of the histogram are cut (see Step 6 in FIG. 4). The clipped range set in S25 will be used as a clipped range of the original image in the Retinex post-process of S2.

In S26 the CPU 2 calculates, for one pixel (x,y), a normalized reflectance value refle(x, y) by normalizing the logarithmic value Rs stored in the reduced Retinex image memory area 23a4 with the clipped range stored in the clipped range memory area 23a8 (the lower limit D through the upper limit U) to 0.3-1.3. The logarithmic value Rs is normalized to 0.3 when the logarithmic value Rs(x, y)≦D, 1.3 when the logarithmic value Rs(x, y)≧U, and according to Equation (3) when 0.3<logarithmic value Rs(x, y)<1.3. In this example, the d and u in Equation (3) are set to 0.3 and 1.3, respectively.

In S27 the CPU 21 uses the normalized reflectance value "refle(x, y)" of the reduced image calculated in S26 in Equation (4) to calculate an output value $Out_y$ of the preview image. Equation (4) is calculated by substituting the luminance signal Ys(x, y) for the signal intensity I(x, y) (see Step 8 of FIG. 4).

Since the gamma coefficient is an arbitrary constant, Equation (4) for calculating an output value Out in the Retinex process has two variables (parameters): the pixel value of the original image (the luminance signal Y) and the normalized reflectance value "trefle". Hence, by computing the normalized reflectance value "refle", it is possible to derive the output value $Out_y$ corresponding to each luminance signal Ys in the range 0-255. Since the calculated output value $Out_y$ should be set to 255 at maximum, output values $Out_y$ exceeding 255 are all outputted as 255.

In S28 the CPU21 converts the output value $Out_y$ found in S28 back to RGB values according to equation (6) to generate output values Out and writes the output values Out to the output image memory area 23a11 in association with the coordinates (x, y) of the source luminance signal Ys. In S29 the CPU21 determines whether the process has been completed for all pixels in the reduced image.

The process in S26-S29 is repeatedly executed for each target pixel (each logarithmic value Rs) until the process has been completed for the logarithmic value Rs of the last pixel. Hence, the CPU 21 reads each logarithmic value Rs from the reduced Retinex image memory area 23a4 in order of the coordinates (in order of raster scans from the beginning coordinate to the ending coordinate) each time the process in S26-S29 is executed. If the CPU 21 confirms that the process has been completed for all pixels (S29: YES), then in S30 the CPU 21 stores, in the median value memory area 23a12, a median-value-corresponding normalized reflectance value "refleM" that is found by normalizing the median value M found in S24 based on the clipped range stored in the clipped range memory area 23a8 and Equation (3), and subsequently ends the Retinex pre-process of S1. It is noted that the median value M is substituted for the value R(x,y) in Equation (3) to find the median-value-corresponding normalized reflectance value "refleM".

However, if the CPU21 determines in S20 that the logarithmic value Rs is greater than or equal to the value stored in the minimum value memory area 23a7 (S20: NO), then the CPU21 skips to the process of S22, since there is no need to update the value in the minimum value memory area 23a7. Further, if the CPU21 determines in S22 that the process for generating logarithmic values Rs and determining the maximum and minimum values of the logarithmic values Rs has not been completed for all pixels in the reduced image (S22: NO), then the CPU21 returns to S16 and repeats the process in S16-S22 until the process has been completed for all luminance signals Ys. Further, if the CPU21 determines in S29 that the output values Out have not been generated for all pixels in the reduced image, then the CPU21 returns to S26 and repeats the process in S26-S29 until the output values Out have been generated for all pixels in the reduced image.

Through the Retinex pre-process of S1, the CPU 21 finds a clipped range (normalization parameters U and D) for the original image using the reduced image. After completing the Retinex pre-process, the CPU 21 outputs the image produced by performing the Retinex process on the reduced image, that is, the output values Out stored in the output image memory area 23a11, at a prescribed timing on the LCD 41 as a preview image (see Step 9 of FIG. 4).

FIG. 7 is a flowchart illustrating steps in the Retinex post-process of S2 executed during the Retinex process shown in FIG. 5. As shown in FIG. 4, the Retinex post-process involves generating luminance signals Y from the RGB values of the original image (Step 2), performing convolution operations (filtering operations using the Gaussian filter (input mask)) to calculate the average luminance values (Step 3), calculating logarithmic values using the average luminance values (Step 4), normalizing the logarithmic values (Step 7), generating output values Out (Step 8), and performing a printing process as the output step (Step 9).

More specifically, in S31 of the Retinex post-process, the CPU 21 converts RGB values for the original image data stored in the original image memory area 23a1 to luminance signals Ys and chrominance signals Cb and Cr (see Step 2 of FIG. 4) and in S31 writes the luminance signals Ys to the luminance memory area 23a3 in association with the coordinates (x, y) of the corresponding RGB values in the reduced image. Through this process, luminance signals Y corresponding to all pixels of the original image are stored in the luminance memory area 23a3. It is noted that after completing the Retinex pre-process of S1, the CPU 21 clears the luminance memory area 23a3 in a step not shown in the drawings prior to beginning the Retinex post-process of S2.

In S32 the CPU 21 confirms that the RAM 23 has sufficient memory capacity for executing the normal Retinex process on the original image. If the RAM 23 has sufficient available memory (S32: YES), then in S33 the CPU 21 sets the available capacity flag 23a13 to ON, indicating that the normal Retinex process can be executed. In this process, the CPU 21 determines whether it is possible to allocate a total memory area including the memory area required for converting pixel values in the original image data to luminance signals Y and performing the filtering operations, the memory area required for performing logarithmic operations on average luminance values found from the filtering operations to obtain logarithmic values R, the memory area required for normalizing the logarithmic values R, and the memory area required for generating output values $Out_y$ and output values Out using the normalized reflectance values "refle". The required memory capacity varies according to the size of the original image and the size of the mask for the original image. For example, if the size of the original image is 1600×1200 pixels and the size of the mask is 121×121 pixels, a memory capacity of 580,800 bytes (1600×121×3) is necessary for processing each of the RGB values in the original image one line at a time.

In the Retinex process performed on the MFP 1, the CPU 21 confirms the available memory in the RAM 23 just prior to beginning the Retinex post-process on the original image. Therefore, the CPU 21 can accurately determine whether the normal Retinex process can be executed based on the current operating state of the MFP 1, which can change from minute to minute. Since the operating state of the MFP 1 is always fluctuating, the memory area in the variable region of the RAM 23 that can be allocated is constantly changing. In this way, it is possible to avoid cases, an which the normal Retinex process cannot be performed even though the RAM 23 was determined to have sufficient memory, because only a small time lag exists between the time that the available capacity of the RAM 23 is determined and the time that the Retinex process is actually performed on the original image using the RAM 23. Hence, the MFP 1 can reliably avoid cases in which the Retinex process itself cannot be performed.

In S34 the CPU 21 determines whether the available capacity flag 23a13 is ON. If the available capacity flag 23a13 is ON (S34: YES), indicating that the normal Retinex process can be executed on the original image, in S35 the CPU 21 calculates, for one pixel, the reflectance value (logarithmic value R) based on the luminance signal Y of the original image stored in the luminance memory area 23a3. The logarithmic value R(x, y) of each pixel is calculated by substituting the luminance signal Y(x, y) for the signal intensity I(x, y) in Equation (2).

More specifically, the CPU21 performs convolution with the Gaussian filter F(x, y) on an M×N region including a target pixel at coordinates (x, y) (executing filtering operations with using input mask, see Step 3 of FIG. 4), to find an average luminance value of peripheral pixels, averaged while applying weight to the peripheral pixels based on their distance from the target pixel, and calculates the logarithmic value R(x,y), which is the reflectance value of the target pixel, by dividing the luminance signal Y(x, y) of the target pixel with the average luminance value and finding a natural logarithm of a resultant value (see Step 4 of FIG. 4). It is noted that the Gaussian filter used in S35 is the input mask that is generated in mask generation process (S12).

Then, in S36 the CPU 21 stores the computed logarithmic value R(x, y) in the logarithmic value memory area 23a9. In S37 the CPU 21 calculates a normalized reflectance value refle(x, y) by normalizing the logarithmic value R stored in the logarithmic value memory area 23a9 with the clipped range stored in the clipped range memory area 23a8 (the lower limit D through the upper limit U) to 0.3-1.3. Therefore, the logarithmic value R of the original image is normalized based on the clipped range (normalization parameters) found from reduced image.

The logarithmic value R is normalized to 0.3 when the logarithmic value $R(x, y) \leq D$, 1.3 when the logarithmic value $R(x, y) \geq U$, and according to Equation (3) when 0.3<logarithmic value R(x, y)<1.3.

Through this process, it is possible to omit Steps 5 and 6 in FIG. 4. Since this eliminates the need to form a histogram of logarithmic values R for the original image, the process can reduce the amount of memory used in the RAM 23 and can also improve the processing speed in the overall Retinex process.

In S38 the CPU 21 stores the normalized reflectance value "refle" calculated for the original image in the refle value memory area 23a10 and in S39 calculates an output value $Out_y$ using the normalized reflectance values "refle" stored in the refle value memory area 23a10 in Equation (4) (see Step 1 of FIG. 4). Equation (4) is computed by substituting the luminance signal Y(x, y) for the signal intensity I(x, y).

In this way, according to the equation (4), the luminance signal Y of a target pixel in the original image is converted into the output value $Out_y$ based on the normalized reflectance value "refle" for the target pixel and the luminance signal Y and according to correlations between the luminance signal Y and the output value $Out_y$ that changes according to the normalized reflectance value "refle", thereby calibrating the luminance signal Y according to the ratio of brightness values between the target pixel and the peripheral pixels thereof.

In S40 the CPU 21 converts the output value $Out_y$ back to RGB values according to equation (6) to generate output values Out and writes the output values Out to the output image memory area 23a11 in association with the coordinates (x, y) of the source luminance signal Y. In S41 the CPU 21 determines whether the process has been completed for all pixels in the original image.

The process in S34-S91 is repeatedly executed for each target pixel (each luminance signal Y) until the process has been completed for the luminance signal Y of the last pixel. Hence, the CPU 21 reads each luminance signal Y from the luminance memory area 23a3 in order of the coordinates (in order of raster scans from the beginning coordinate to the ending coordinate) each time the process in S34-S41 is executed. It the CPU 21 confirms that the process has been completed for all pixels (S41: YES), the CPU 21 sets the available capacity flag 23a13 to OFF, and subsequently ends the Retinex post-process of S2.

After completing the Retinex post-process of S2, the CPU 21 outputs the output values Out stored in the output image memory area 23a11 in S40 to the printer 2 at a prescribed timing (see Step 9 of FIG. 4).

However, if the CPU 21 determines in S32 that the RAM 23 does not have sufficient available memory for performing the normal Retinex process, then the CPU 21 leaves the available capacity flag 23a13 in the OFF setting to indicate that the normal Retinex process cannot be performed. The CPU 21 skips the process in S35-S39 and in S43 calculates the output value $Out_y$ by substituting the median-value-corresponding normalized reflectance value "refleM" stored in the median value memory area 23a12 for the reflectance component "refle" in Equation (4). It is noted that the luminance value Y(x,y) is substituted for the signal intensity I(x,y) in Equation (4).

In other words, when the required memory area cannot be allocated, as indicated by the dotted arrow in FIG. 4, the CPU 21 skips Steps 3 through 7, before generating the output values Out in Step 8. Hence, the CPU 21 executes a simplified Retinex process.

A separate program from the program on a multifunction peripheral configured to perform the normal Retinex process must be designed for another multifunction peripheral configured to execute only a simplified Retinex process to avoid cases in which image processing is impossible. However, according to this embodiment, a common program can be used on different types of multifunction peripherals (multifunction peripherals with different capacities of RAM) by switching between the normal Retinex process and the simplified Retinex process for an original image according to the available capacity of the RAM 23, thereby reducing the labor involved in developing the program.

Further, the available capacity flag 23a13 is set to OFF in a step not shown in the drawings prior to beginning the Retinex process. This ensures that if the RAM 23 does not have sufficient available memory for performing the Retinex process, the setting of the available capacity flag 23a13 is OFF when the CPU 21 performs S43. After completing the process in S43, the CPU 21 advances to S40.

Further, if the CPU 21 determines in S34 that the available capacity flag 23a13 is OFF (S34; NO), indicating that the normal Retinex process cannot be executed on the original image, the CPU 21 advances to S43 to perform the simplified Retinex process. Further, if the CPU 21 determines that output values Out have not been generated for all pixels in the original image (S41: NO), then the CPU 21 returns to S34 and repeats the process in S34-S41 or S43 until output values Out have been generated for all pixels in the original image.

As described above, when the RAM 23 has insufficient available memory, the MFP 1 can perform a simplified Retinex process that requires less memory capacity by omitting the filtering operations (convolution operations) for calculating average luminance values and the logarithmic computations (calculations of logarithmic values R), which both require a large amount of memory, thereby avoiding cases in which image correction cannot be performed due to insufficient memory in the RAM 23. Further, when the RAM 23 has sufficient available memory, the MFP 1 can perform the normal Retinex process on the original image. In this way, the MFP 1 does not unnecessarily perform the simplified Retinex process, which produces a corrected image of lower quality than that produced in the normal Retinex process.

Modifications of the First Embodiment

While the MFP 1 according to the first embodiment described above switches between the normal Retinex process and the simplified Retinex process based on the available capacity of the RAM 23, the MFP 1 may instead be configured to perform the simplified Retinex process in all image processing. This method reduces the amount of memory in the RAM 23 required for the Retinex process, thereby making it possible to produce a multifunction peripheral provided with inexpensive RAM in order to keep down manufacturing costs. That is, the Retinex post-process of S2 may be configured from the processes of S31, S43, S40, and S41 only. In this case, when the judgment of S41 is negative, the process returns from S41 directly to S43.

Further, the MFP 1 of the first embodiment described above is configured to switch between the normal Retinex process and the simplified Retinex process based on the available capacity of the RAM 23. However, the MFP 1 may instead be configured to determine whether the printer 2 is currently operating by providing a step for monitoring printer operations and a flag (switch or the like) to be set ON when the printer begins operations and OFF when the printer ends operations, and to switch between the normal Retinex process and the simplified Retinex process based on whether the printer 2 is operating. The MFP 1 may also be configured to switch between the normal Retinex process and the simplified Retinex process based on whether the scanner 3 is operating or whether a facsimile operation is being executed. In this way, the MFP 1 can quickly determine whether simplified correction should be performed, without performing a complex operation such as checking the available capacity of the RAM, thereby reducing the control load on the CPU 21.

Further, in the Retinex post-process of S2 described above, the CPU 21 determines the available memory in the RAM before the start of the post-process and switches between the normal Retinex process (post-process) and the simplified Retinex process based on the results of this determination. After deriving the results of this determination, the CPU 21 performs either the normal Retinex process or the simplified Retinex process until processing of the original image is complete.

However, the CPU 21 may be instead configured to advance to S32 after completing the process in S41 to determine the available capacity of the RAM 23 each time a process is performed on one pixel of the original image and to switch between the normal Retinex process and the simplified Retinex process based on the results of this determination. This process considers the constant changes in the operating state of the MFP 1 to account for cases in which a printing operation or facsimile operation is initiated during image processing or cases in which one of such operations ends during image processing. By determining the available capacity of the RAM 23 each time a process is to be executed on a pixel of the original image, it is possible to perform the simplified Retinex process on the original image only when needed and to immediately switch to the normal Retinex process when sufficient available memory is freed up in the RAM 23, thereby reducing the range in which the Retinex process is performed according to the simplified correction method and, hence, achieving more accurate image correction.

The MFP 1 of the embodiment described above is configured to execute the simplified Retinex process of S43 by using the median-value-corresponding normalized reflectance value "refleM". However, the MFP 1 may instead be configured to execute the simplified Retinex process of S43 by using a normalized reflectance value "refle" that is calculated for the most frequently appearing logarithmic value Rs. In this case, the RAM 23 includes a most frequent value memory area, instead of the median value memory area 23a12, for storing a normalized reflectance value "refle" of the most frequently appearing value of the logarithmic value Rs. In S24, the CPU 21 selects the most frequently appearing value among the logarithmic values Rs in the histogram. In S30, a normalized reflectance value refle is calculated for the most frequently appearing logarithmic value instead of the median value M, and is stored in the most frequent value memory area. In S43, the normalized reflectance value refle calculated for the most frequently appearing logarithmic value is used for calculating the output value $Out_y$.

The MFP 1 may instead be configured to execute the simplified Retinex process of S43 by using a normalized reflectance value "refle" that is calculated for a representative value of the logarithmic value Rs that is other than the median value M or the most-frequently-appearing value but that can still properly represent the histogram of the logarithmic values Rs similarly to the median value M and the most-frequently-appearing value.

Second Embodiment

Next, a second embodiment of the present invention will be described while referring to FIGS. 8-15.

Figure 8:
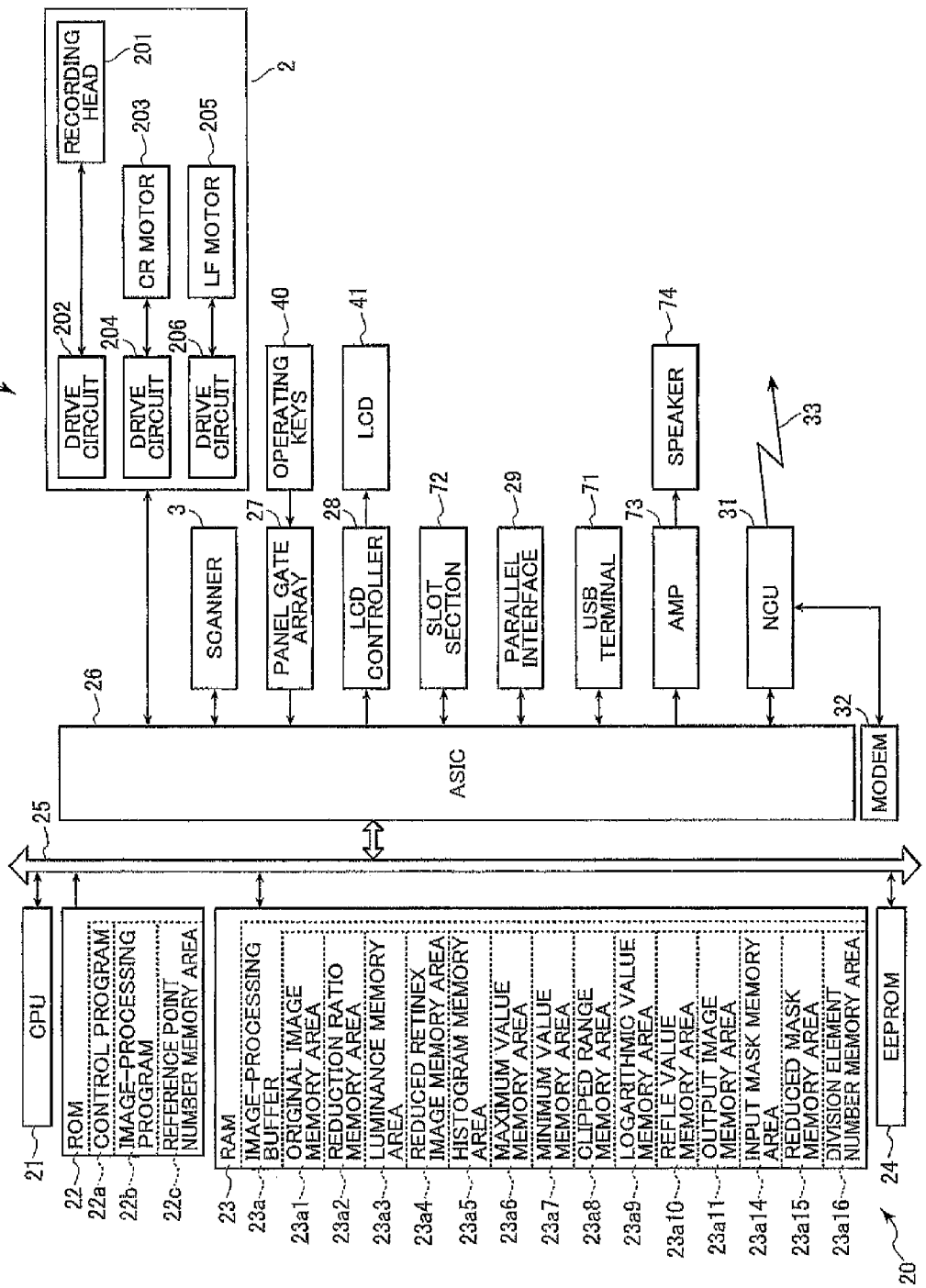
FIG. 8 is a block diagram showing the electrical structure of a multifunction peripheral according to a second embodiment of the present invention.
Figure 9:
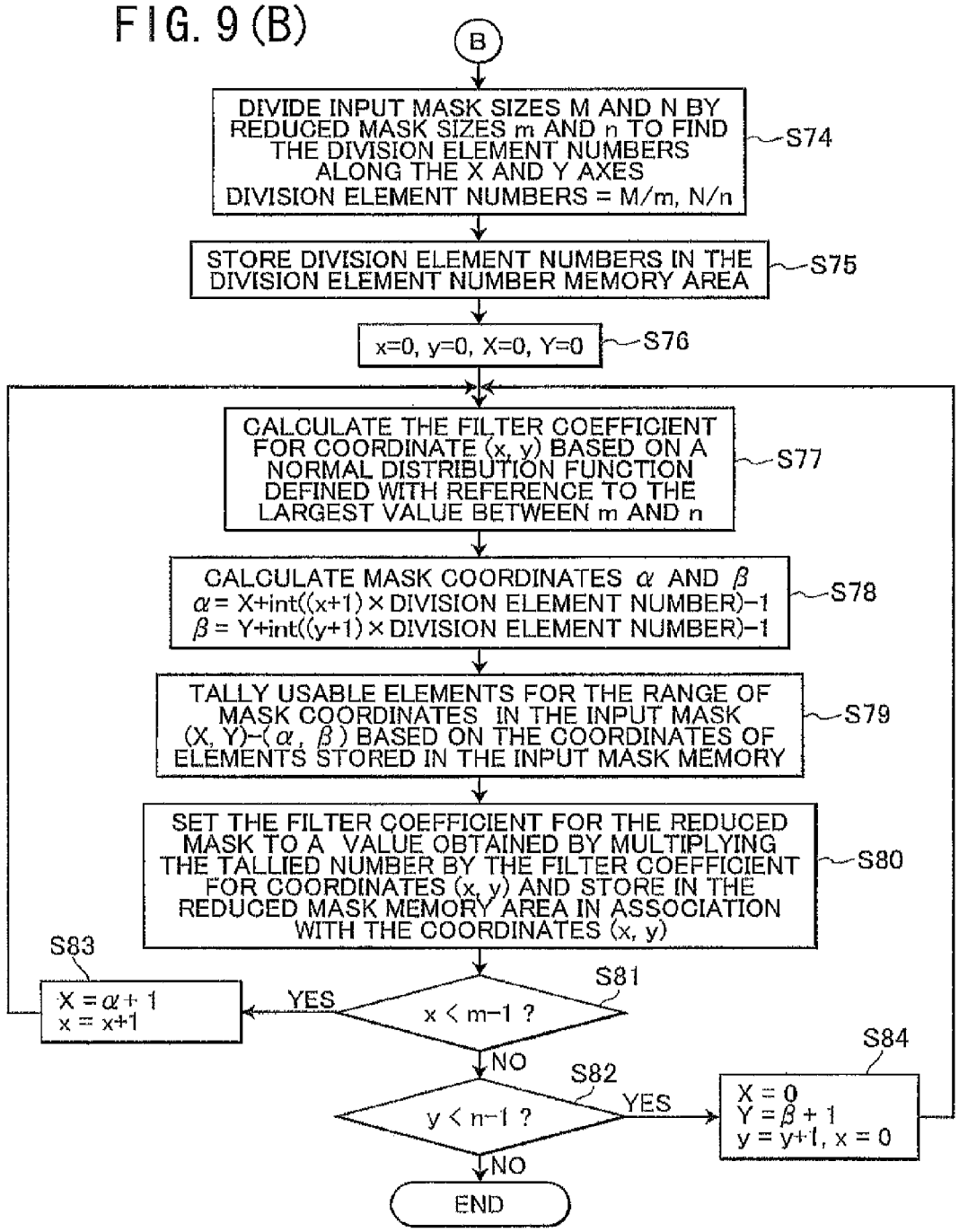
FIG. 9(A) is a flowchart illustrating a part of steps in a mask generation process executed during the Retinex pre-process of FIG. 5 according to the second embodiment.
FIG. 9(B) is a flowchart illustrating a remaining part of steps in the mask generation process.

A multifunction peripheral 101 according to the present embodiment is the same as the multifunction peripheral 1 of the first embodiment except for the following points:

As shown in FIG. 8, according to the present embodiment, the ROM 22 further includes a reference point number memory area 22c. The RAM 23 does not include the median value memory area 23a12 or the available capacity flag 23a13, but includes an input mask memory area 23a14, a reduced mask memory area 23a15, and a division element number memory area 23a16.

Similarly to the first embodiment described above, the MFP 101 performs the Retinex pre-process of S1 and Retinex post-process of 32 as described with reference to FIG. 5. The Retinex pre-process of S1 in the second embodiment is the same as that of the first embodiment (FIGS. 6(A) and 6(B) except that the process in S30 is not executed. The Retinex post-process of 52 in the second embodiment is the same as that of the first embodiment (FIG. 7) except that the process in S32, S33, S34, S42 or S43 is not executed. In other words, according to the second embodiment, the simplified retinex process is not executed, but only the normal retinex process is executed. That is, in the Retinex post-process of S2, processes of S31, S35, S36, S37, S38, S39, S40, and S41 are executed. When the judgment of S41 is negative (no in S41), the process returns from S41 to S35.

According to the first embodiment, all the elements in the input mask are used for the filtering operations. In other words, the input mask has no skipped elements. Contrarily, according to the present embodiment, the input mask has skipped elements that are not used for the filtering operations.

The reference point number memory area 22c stores the number of elements (reference points) actually used in the Gaussian filter (input mask) when executing a filtering operation on an original image to generate average luminance values.

The number stored in the reference point number memory area 22c is smaller than the total number of elements in the input mask, which is formed of an M×N matrix, and has a lower limit of approximately $\frac{1}{30}^{th}$ the total number of elements.

When generating the input mask in the mask generation process of S12, the CPU 21 references the reference point number memory area 22c and stores filter coefficients only for the elements stored in the reference point number memory area 22c. In other words, the CPU 21 forms the input mask having a pattern of thinned out elements.

The input mask memory area 23a14 stores the input mask that is a Gaussian filter configured of an M×N matrix and that is produced in S12. The input mask has a predefined size with an odd number of elements, such as a 21×21 matrix forming a total of 441 elements. XY coordinates (mask coordinates) are assigned to each element in the input mask for identifying the position of the element in the mask, where the coordinates (0, 0) indicate the upper left element and the coordinates (20, 20) the lower right element (for a 21×21 matrix). In other words, in the input mask, coordinates-assigned elements are arranged two-dimensionally, the X coordinate grows larger when moving from left to right along the X-axis and the Y coordinate grows larger when moving downward along the Y-axis. Further, the identification numbers 0-440 are assigned to the elements so as to increase sequentially an the coordinates increase, that is, in an order progressing from the left edge to the right edge of the mask along the X-axis and progressing down row by row along the Y-axis after reaching the last element in the row.

In the mask generation process of S12 according to the present embodiment, random numbers, whose total number is equal to the number stored in the reference point number memory area 22c, are acquired and filter coefficients are stored only in the elements corresponding to the acquired random numbers. As described above, the number of elements stored in the reference point number memory area 22c is less than the total number (441 in this example). Therefore, the input mask stored in the input mask memory area 23a14 will have a pattern with skipped elements.

It is well known that the results obtained from a filtering operation on most natural images differ little whether using a mask having skipped elements or a mask having all elements by taking the sum of products of existing elements in the mask and corresponding pixels in the target image.

Hence, according to this embodiment, by using a mask with skipped pixels, the time required for completing the filtering operations is shortened, and the amount of memory required for the operations is reduced.

The reduced mask memory area 23a15 stores a reduced mask for performing filtering operations on the reduced image. The reduced mask is a Gaussian filter configured of an m×n matrix produced in the mask generation process of S12. The reduced mask is created based on the input mask stored in the input mask memory area 23a14.

The reduced mask is created based on the size ratio between the original image and the reduced image. More specifically, the reduced mask is created by reducing the input mask based on the reduction ratios stored in the reduction ratio memory area 23a2.

As will be described in greater detail later, the MFP 101 according to the present embodiment is configured to create the reduced mask by reducing the input mask while reflecting the skipped pattern of the input mask in the reduced mask, and to store the reduced mask in the reduced mask memory area 23a15.

The MFP 101 manages each element of the reduced mask with mask coordinates (x,y) for identifying assigned positions in the mask, similar to the input mask.

The division element number memory area 23a16 stores the number of elements in the input mask (division element number) corresponding to one element in the reduced mask. The division element number indicates the number of elements belonging to a divided section when the total number of elements in the input mask is divided by the total number of elements in the reduced mask. The division element number may be a value directly indicating the number of elements belonging to a divided section of the input mask or may be values indicating the number of elements arranged along the X-axis and the number of elements arranged along the Y-axis of the divided section.

Obviously, since the reduced mask is produced by reducing the input mask, the number of elements in the reduced mask is less than that in the input mask and is substantially equal to the reduction ratio multiple of the number of elements in the input mask. Since the numbers to the right of the decimal are rounded off when calculating the number of elements in the reduced mask, error is introduced so that the number of elements in the reduced mask is often not strictly the reduction ratio multiple.

The division element number is found by dividing the number of elements along the X-axis and Y-axis of the input mask with the number of elements along the corresponding axis of the reduced mask. The division element number for each axis is stored in the division element number memory area 23*a*16.

Since the reduction ratio of the image is often different along the X-axis and Y-axis, the reduction ratio is found for both the X-axis and the Y-axis. However, the input mask is formed in a square shape. Accordingly, when generating a reduced mask, a division of the input mask corresponding to each element in the reduced mask is often rectangular in shape, with different vertical and horizontal sizes. Hence, the division element number is found for both the X-axis and Y-axis of the mask, rather than simply finding a division element number by dividing the total number of elements in the input mask by the total number of elements in the reduced mask.

Here, the total number of elements in the input mask is the number of all elements MN included in the input mask formed by an M×N matrix, and the total number of elements in the reduced mask is the number of all elements mn in the reduced mask formed by an m×n matrix, regardless of whether the elements hold a filter coefficient.

The MFP 101 generates the reduced mask maintaining consistency with the input mask by partitioning the input mask based on the division element numbers stored in the division element number memory area 23*a*16 and reflecting the elements belonging to each divided seotion of the input mask in a corresponding single element of the reduced mask.

The division element number often includes a fraction part to the right of the decimal. Therefore, when the input mask is divided by this division element number, one element becomes split at the dividing position forming a boundary between divided sections. Hence, in this embodiment, the mask coordinates obtained when dividing the input mask by the division element number are rounded off, shifting the dividing position so that the number of elements in the input mask corresponding to the single element in the reduced mask is an integer. Therefore, while strictly speaking the divided sections formed in the input mask deviate from the theoretical division boundaries, the deviation is based on determining whether or not to include a single element in a section and, hence, is small. Accordingly, this method of shifting the dividing positions does not noticeably drop the consistency between the generated reduced mask and the input mask.

Since this process makes it possible to reflect the content of a plurality of elements from the input mask in a corresponding single pixel of the reduced mask and to set the number of this plurality of elements as an integer, fractional parts of numbers need not be treated in the process for reflecting the plurality of elements in the single element of the reduced mask, thereby simplifying the process.

Next will be described the mask generation process of S12 according to the present embodiment with reference to FIGS. 9(A) and 9(B).

The mask generation process involves generating an input mask and generating a reduced mask consistent with the input mask from the input mask. As described above, the masks (Gaussian filters) generated in the mask generation process are used to perform filtering operations in S16 of the Retinex pre-process in S1 and in S35 in the Retinex post-process in S2.

In S61 at the beginning of the mask generation process, the CPU 21 reads the number of reference points stored in the reference point number memory area 22*c* and in S62 initializes a variable i to 0. In S63 the CPU 21 executes a random number generation process for generating a pseudo random number within a finite range corresponding to the number of elements in the input mask based on a prescribed algorithm. Through the random number generation process of S63, the CPU 21 can generate one random value each time the process is executed, while obtaining the value with random uniformity (i.e., all values have the same probability of being selected, but the value is not selected more than once in a series of selections).

In this process, the size of the input mask is known. Hence, if the input mask is to be formed of a 21×21 matrix, for example, the range of random values to be generated is set to identification numbers 0-440 corresponding to the 441 total number of elements in the input mask. Hence, any of the identification numbers can be specified based on the generated random value.

Since each of the identification numbers is associated with mask coordinates assigned to each of the elements, in S64 the CPU 21 calculates a filter coefficient for mask coordinates corresponding to the generated random number according to a normal distribution function.

Figure 10:
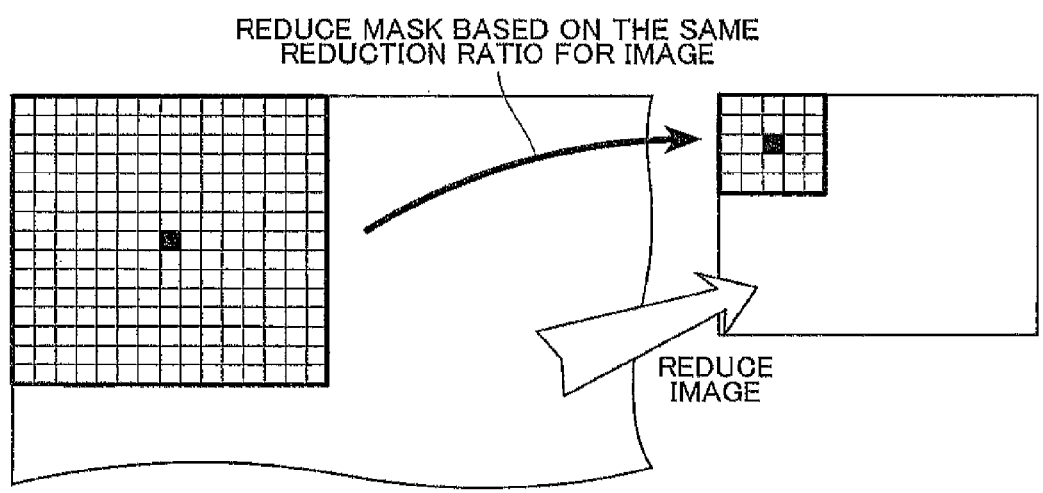
FIG. 10(A) conceptually illustrates an original image and an input mask on the left side, and a reduced image and a reduced mask on the right side.
FIG. 10(B) is an explanatory diagram showing the basic structure of the input mask and the reduced mask, and further showing, below each mask, graphs indicative of changes in filter coefficients stored for elements in the corresponding mask in the left-to-right direction of the mask, including the center element.
Figure 10:
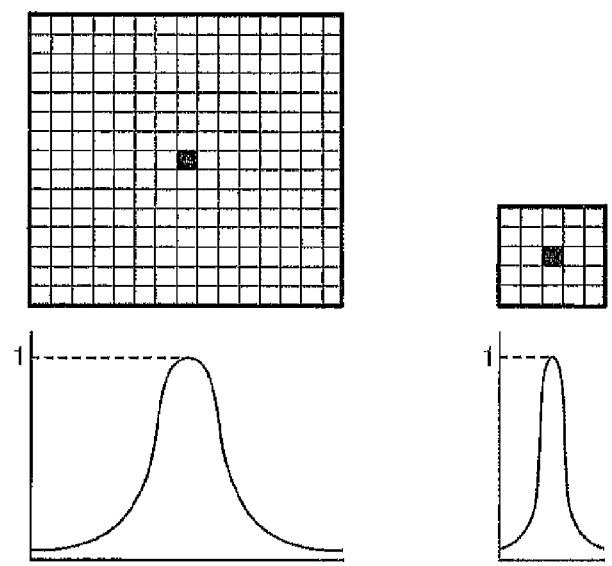

FIG. 10(*b*) shows the input mask on the left side and the reduced mask on the right. Below each mask, changes in the filter coefficients stored for elements are graphed in the left-to-right direction of the mask, including the center element. In these graphs, the horizontal axis represents the position of the element and the vertical axis represents the filter coefficient.

As can be seen from FIG. 10(*b*), the filter coefficients stored in elements of each mask are basically arranged similarly with respect to the input mask and the reduced mask. In other words, since both the input mask and the reduced mask are configured of a Gaussian filter, the filter coefficient stored in the center element is set to "1", and filter coefficients set for other elements gradually decrease away from the center element in all directions accordingly to a normal distribution function.

A filter coefficient is also set for each element of the mask according to a normal distribution function so that a normal distribution curve is depicted along the width of the mask. Hence, it is possible to calculate the filter coefficient to be stored in an element if the position of the element in the mask (mask coordinates) is known.

In S65 after completing the process in S64, the CPU 21 stores the calculated filter coefficient in the input mask memory area 23*a*14 in association with the mask coordinates.

In S66 the CPU 21 increments the variable i by 1, and in S67 determines whether the variable i is greater than or equal to the number of reference points stored in the reference point number memory area 22*c*. If the variable i is less than the number of reference points (S67: NO), then filter coefficients have not yet been calculated for all elements in which a filter coefficient is to be stored, and the CPU 21 returns to S63. The CPU 21 repeatedly performs the process in S63-S67 until filter coefficients have been calculated for all necessary elements.

However, when the variable i is greater than or equal to the number of reference points (S67: YES), indicating that filter coefficients have been calculated for all required elements, then in S68 the CPU 21 reads the reduction ratios stored in the reduction ratio memory area 23*a*2, and multiplies an X-axis length M of the input mask (number of elements or columns in the X direction) and the Y-axis length N (number of elements or rows in the Y direction) by the respective reduction ratios to calculate reduced mask sizes m, n. Here, m indicates the number of elements in the reduced mask along the X-axis and n is indicates the number of elements in the reduced mask along the Y-axis.

Next, the basic structure of the masks (Gaussian filters) used in this embodiment will be described with reference to FIG. 10(A). FIG. 10(A) conceptually illustrates an original image and input mask on the left side, and the reduced image and reduced mask on the right side. As shown in FIG. 10(A), the input mask and reduced mask in this embodiment are basically configured to have the same size ratio as the size ratio of the original image and reduced image. The reduced mask is created from the input mask based on the size ratio of the original image and reduced image (the reduction ratios stored in the reduction ratio memory area 23a2).

As described above, the size of the reduced image is fixed, while the size of the inputted original image can be set arbitrarily by the user. Therefore, the reduction ratios must be modified based on the size of the original image. Setting the size ratios of the input mask and reduced mask equal to the size ratios of the original image and reduced image is one factor in maintaining coherence between the two masks. Since the input mask has a fixed size in the present embodiment, the size of the generated reduced mask changes when the reduction ratios change based on the size of the original image. In other words, reduced masks of different sizes are generated according to the size of the original image.

In S69 the CPU 21 converts the mask sizes m, n calculated for the reduced mask to integer values by rounding off values to the right of the decimal (m→int(m), n→int(n)). When calculating the reduced mask size by multiplying the reduction ratios by the input mask size, the mask size is often calculated with the fraction value on the right side of the decimal point. Since each element of the mask corresponds to one pixel of the image, the mask size must be defined by natural numbers. Therefore, the CPU 21 converts the mask size to integer values by rounding off the size of the reduced mask in S69.

In S70 the CPU 21 determines whether m is an odd number. If m is an even number (S70: NO), then in S71 the CPU 21 increments this value by 1 to convert m to an odd number. In S72 the CPU 21 determines whether the mask size n is an odd number. If n is an even number (S72: NO), then in S73 the CPU 21 adds 1 to this value to convert n to an odd number. In this way, the reduced mark size is determined. In S70 and S72, a is a natural number. While the CPU 21 determines in S70 and S72 whether m and n are odd or even by checking whether m and n are odd numbers, the CPU 21 may make this determination by checking whether m and n are even numbers.

Sometimes the mask sizes m and n are even after generating the reduced mask with the reduction ratio of the images. Since the filtering operations are performed by taking the sum of products with the center pixel of the mask (filter) associated with a target pixel in the image, the center pixel cannot be superimposed over the target pixel when the mask size is even. Therefore, a 1 is added to the mask size when the mask size is even to adjust this mask size to an odd value. However, since the number of pixels is only adjusted by a value of 1, the sizes of the input mask and reduced mask are substantially equivalent to the size ratio of the original image and the reduced image. In the present embodiment, the CPU 21 adjusts an even mask size to an odd value by adding 1 to the mask size. However, the method of adjusting the mask size to an odd value is not limited to this method. For example, the CPU 21 may decrease an even mask size by 1 or may increase or decrease the mask size by an odd value greater than 1.

In S74 the CPU 21 finds the division element numbers along both the X-axis and Y-axis by dividing the input mask sizes M, N by the reduced mask sizes m, n and in S75 stores the division element numbers in the division element number memory area 23a16. In S76 the CPU 21 initializes variables x, y, X, and Y to 0, where the variables x and y indicate the coordinates in the reduced mask and the variables X and Y indicate the coordinates in the input mask.

In S77 the CPU 21 calculates the filter coefficient for coordinates (x, y) in the reduced mask according to a normal distribution function defined based on the larger of the mask size m for the X-axis and the mask size n for the Y-axis because the reduced mask is most often formed in a rectangular shape when the reduction ratio differs between the X-axis and Y-axis, as described above.

Figure 11:
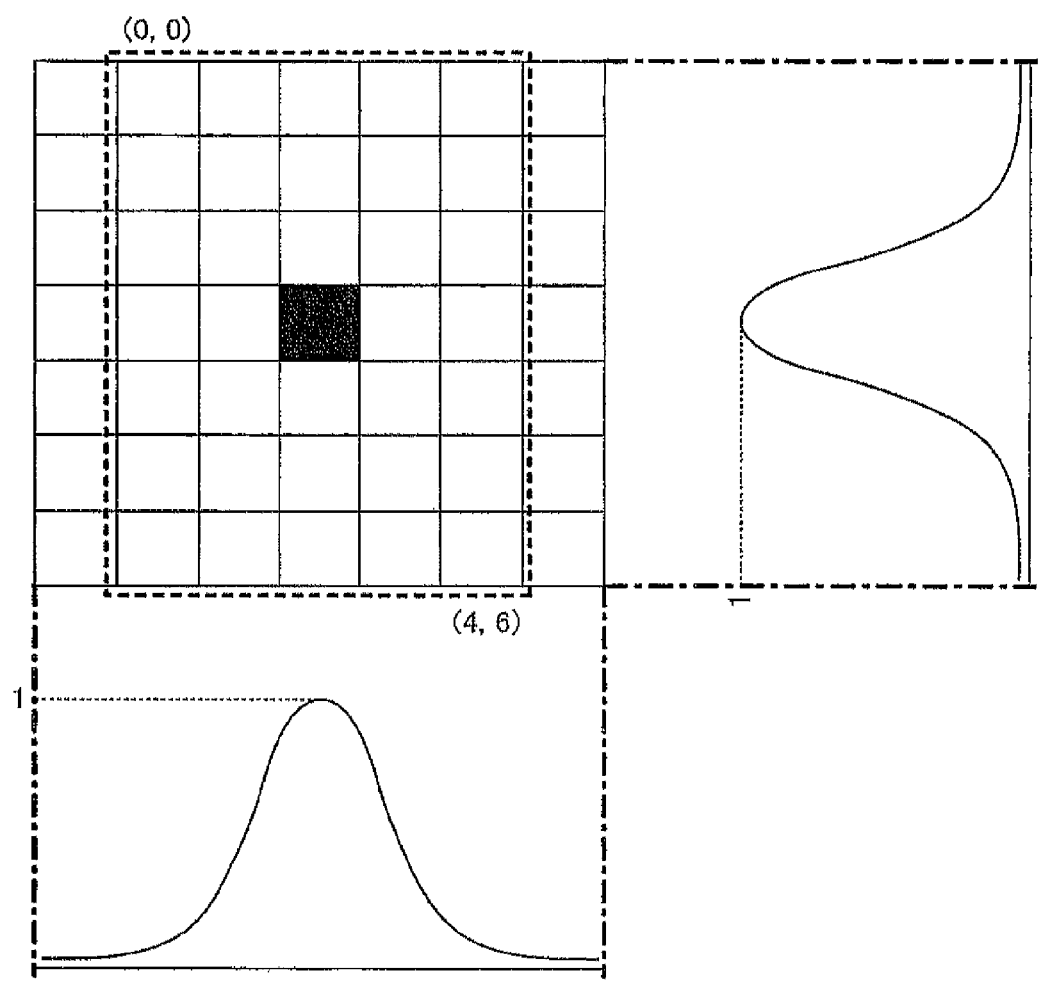
FIG. 11 is an explanatory diagram showing the filter coefficients stored in elements of the reduced mask.
Figure 12:
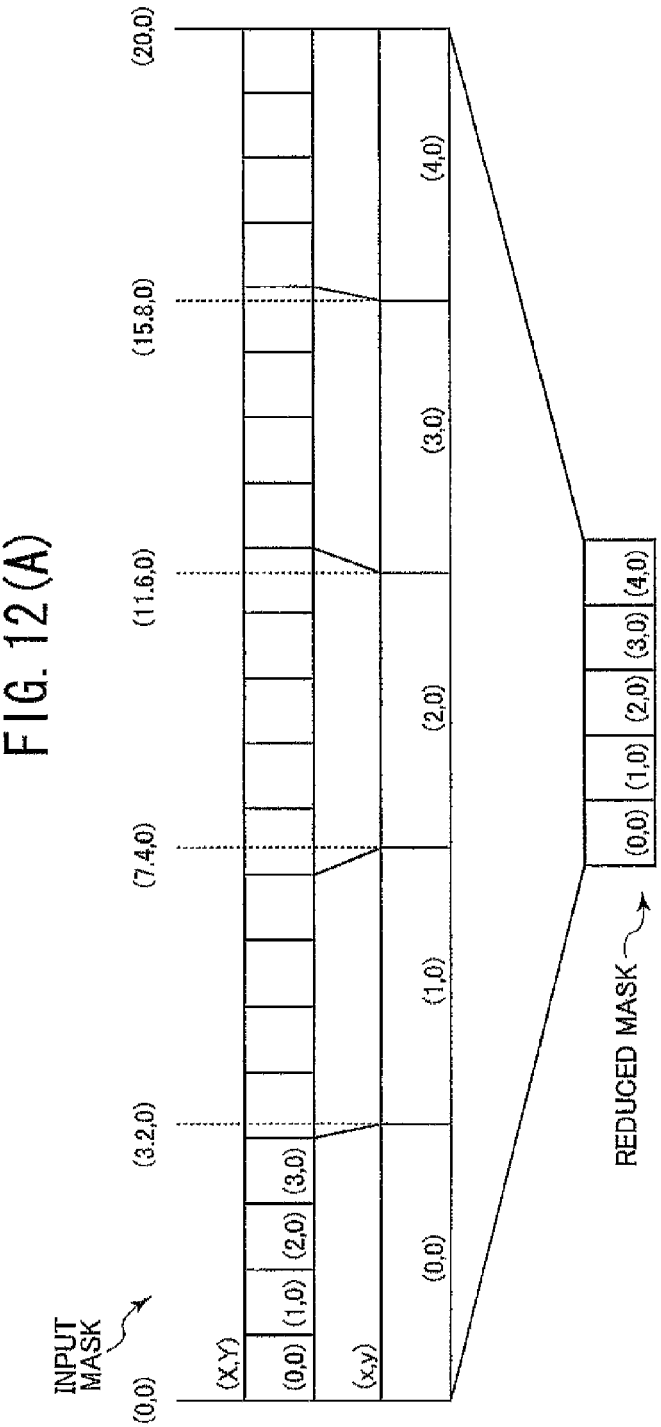
FIG. 12(A) is an explanatory diagram illustrating a method of dividing the input mask.
FIG. 12(B) shows parameter values used for dividing the input mask into sections.

FIG. 11 shows an example of a mask configured of a 5×7 matrix as an example of the reduced mask generated in this process. The graphs below and to the right of the mask in FIG. 11 indicate changes in the filter coefficients stored in elements of the mask, including the central element, in both the left-to-right direction and the vertical direction. In both graphs of FIG. 11, the horizontal axis (the axis extending left and right in the lower graph and the axis extending vertically in the right graph) represent the positions of the elements, while the vertical axis (the axis orthogonal to the horizontal axis) represents the filter coefficients.

Filter coefficients are assigned to elements in the reduced mask by setting the filter coefficient stored in the central element to "1" and setting gradually decreasing filter coefficients based on a normal distribution function as the elements grow farther from the center element in any direction.

Although the reduced mask generated in this process is actually the 5×7 matrix delineated by the dotted line in FIG. 11, filter coefficients stored in each element are set according to a normal distribution function based on the largest value of the mask size in order to describe a normal distribution curve along the width of a 7×7 matrix.

However, mask coordinates for the reduced mask are assigned to elements in the 5×7 matrix of the actual reduced mask indicated by the dotted line with coordinates for the upper left element set to (0, 0) and for the lower right element set to (4, 6). The filter coefficients calculated above are managed in association with the mask coordinates of the actual reduced mask.

In S78 the CPU 21 calculates mask coordinates ($\alpha$, $\beta$). The mask coordinates ($\alpha$, $\beta$) define one divided section in the input mask and, more specifically, indicate the final coordinates in the section of the input mask corresponding to a single element of the reduced mask (coordinates for the bottom right element in the section of the input mask expressed in a two-dimensional matrix). The coordinate $\alpha$ is the X coordinate of the final element in this section, while the coordinate $\beta$ is the Y coordinate. The coordinate $\alpha$ is found according to the following calculation:

The division element number along the X-axis stored in the division element number memory area 23a16 is multiplied by a value (x+1) obtained by adding 1 to the x coordinate of an element in the reduced mask used for finding the filter coefficient, and the result is rounded off to produce an integer. Next, $\alpha$ is found; by subtracting 1 from the integer value to convert the number of elements to a value in the coordinate system; and by adding the converted value to X indicating the leading element in the corresponding section of the input mask.

Similarly, when calculating the coordinate $\beta$, the division element number along the Y-axis stored in division element number memory area 23a16 is multiplied by a value (y+1) obtained by adding 1 to the y coordinate of an element in the reduced mask used for finding the filter coefficient, and the result is rounded off to produce an integer value, Next, β is found by subtracting 1 from this integer value to convert the number of elements to a value in the coordinate system and by adding the converted value to Y indicating the top element in the corresponding section of the input mask.

Values obtained by multiplying the division element number by a number obtained by incrementing the x coordinate of the reduced mask by 1 (x+1) and by multiplying the division element number by a value obtained by incrementing the y coordinate of the reduced mask by 1 (y+1), or more simply n multiples of the division element number (where n is a natural number greater than or equal to 1), are coordinate values indicating a dividing position of a section of the input mask corresponding to the x and y coordinates of the reduced mask.

FIGS. 12(A) and 12(B) show an example of a method for creating a reduced mask configured of a 5×7 matrix from an input mask configured of a 21×21 matrix. Since this process is similar for both axes, a description will only be given for the X-axis.

FIG. 12(A) conceptually illustrates a method of dividing the input mask. FIG. 12(B) shows parameter values used for dividing the input mask into sections, where the left side of the table is a description of the variable and the right side is the corresponding value. In the example shown in FIG. 12(B), the size of the input mask along the X-axis is 21, and the reduction ratio along the X-axis is ⅕. The size of the reduced mask along the x-axis is calculated as 4.2 by multiplying the input mask size by the reduction ratio. This value is rounded off to form an integer and incremented by 1 to form an odd number, resulting in a mask size of 5. When elements of the input mask along the X-axis are divided by this mask size 5, the division element number on the X-axis is found to be 4.2.

The lower part of FIG. 12(A) indicates coordinates of elements in one row of the reduced mask. The mask coordinates for these elements are (0, 0)-(4, 0). The upper part of FIG. 12(A) indicates the elements for one row of the input mask. The mask coordinates of these elements are set to (0, 0)-(20, 0). Since the division element number is 4.2, the positions indicated by dotted lines in the input mask are dividing positions corresponding to the division element number. Described in coordinates, the dividing positions are (3.2, 0), (7.4, 0), (11.6, 0), and (15.8, 0). Each section of the input mask along the X-axis from (0, 0) to (20, 0) divided by these dividing positions includes 4.2 elements.

An enlarged reduced mask is shown below the input mask in FIG. 12(A). While sections of the input mask are defined by positions indicated by the dotted lines based on the division element number, that is, the range displayed with the same size as one element of the enlarged reduced mask, dividing positions found from the division element number are converted to integers in the present embodiment, and the coordinates of each section in the input mask are determined from the converted dividing positions. For example, while the region of the input mask including 4.2 elements from the start of the mask actually corresponds to the element in the reduced mask having coordinates (0, 0), the dividing position is modified to a position including four elements by rounding off the dividing position to an integer value. As a result, the division of the input mask corresponding to mask coordinates (0, 0) in the reduced mask is the region of the input mask including X coordinates 0-3. Similarly, the section of the input mask corresponding to coordinates (1, 0) of the reduced mask includes X coordinates 4-7 of the input mask; the section of the input mask corresponding to coordinates (2, 0) of the reduced mask includes X coordinates 8-12 of the input mask; the section of the input mask corresponding to coordinates (3, 0) of the reduced mask includes X coordinates 13-16 of the input mask; and the section of the input mask corresponding to coordinates (4, 0) of the reduced mask includes X coordinates 17-20 of the input mask.

Hence, the MFP 101 of the present embodiment rounds off each of the dividing positions so that the number of elements in a divided section is an integer, thereby not dividing elements. While this method changes the number of pixels in a given divided section, the change is no greater than two elements, which is not a major change from the original section. Therefore, it is possible to simplify the process of counting the number of elements in a section used in a filtering operation (the elements containing filter coefficients). This method also improves coherence between the two masks by assigning all elements in the input mask to the reduced mask.

In S79 the CPU 21 tallies the number of elements used in a filtering operation for mask coordinates of the input mask ranging between (X, Y) through (α, β) based on the mask coordinates of elements stored in the input mask memory area 23a14. This is implemented by checking the number of filter coefficients stored in the input mask memory area 23a14 within the range of mask coordinates from (X, Y) to (α, β), because in the process of S63-S67 the MFP 101 stores only coordinates of elements equivalent to the number of reference points and the filter coefficients corresponding to these elements in the input mask memory area 23a14.

In S80 the CPU 21 multiplies the tallied number (provided the number is not 0) by the filter coefficient for the mask coordinates (x, y) in the reduced mask found in S77, sets the result as the filter coefficient for the reduced mask, and stores the value in the reduced mask memory area 23a15 in association with the mask coordinates (x, y).

If the tallied number in S79 is 0, the CPU 21 recognizes the element as being unused in filtering operations on the reduced image. It is possible to have the CPU 21 recognize elements not used in filtering operations by storing data of some sort in the reduced mask memory area 23a15 indicating the unused elements in association with their mask coordinates or by not storing mask coordinates in the reduced mask memory area 23a15 when the tallied result in S79 is 0 so that the CPU 21 can recognize elements of these mask coordinates that are not used in filtering operations In the present embodiment, the CPU 21 does not store mask coordinates for corresponding elements in the reduced mask memory area 23a15 when the tallied result in S79 is 0.

Figure 13:
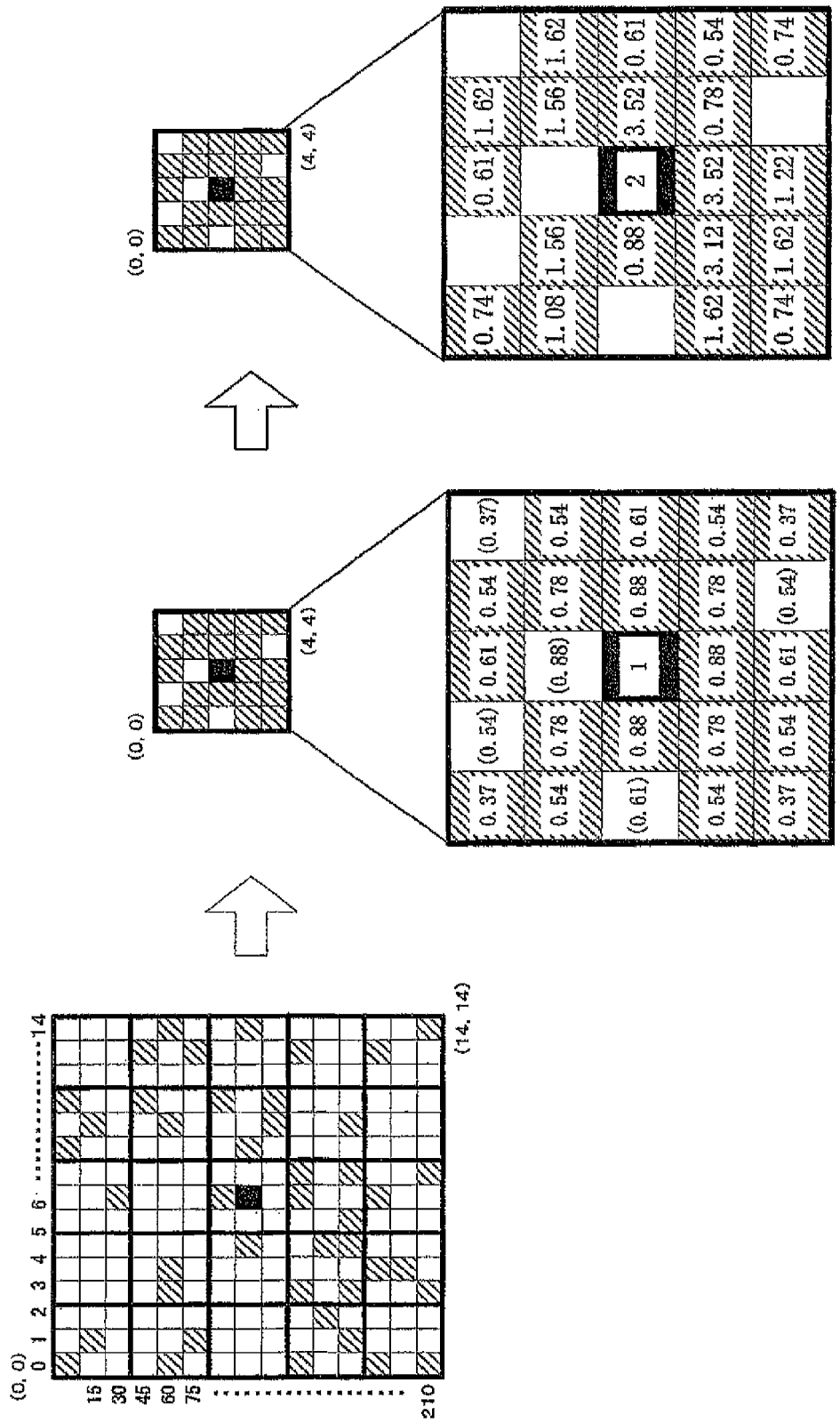
FIG. 13 is an explanatory diagram illustrating the principles of generating the reduced mask that reflects the skipped pattern of the input mask.

Next, the principles of generating the reduced mask will be described in greater detail with reference to FIG. 13. On the far left, FIG. 13 shows an input mask formed of a 15×15 matrix. Mask coordinates are assigned to each element of this input mask such that (0, 0) is assigned the element in the upper left corner and the last coordinates (14, 14) the element in the lower right. Identification numbers from 0 to 224 are also assigned to each element according to the order described above. Hence, identification numbers 0, 1, 2, 3, 4, 5, 6, 7, . . . , and 14 are assigned to elements arranged in the top row of the input mask and identification numbers (0), 15, 30, 45, 60, 75, . . . , and 210 are assigned to elements along the leftmost column.

In the input mask of FIG. 13, elements with hatch marks are actually used in filtering operations, while those without (white elements) are not used in filtering operations. The filled black element indicates the center element that is aligned with the target element.

To the right of the input mask in FIG. 13 is the reduced mask configured of a 5×5 matrix created from the input mask. Hence, a section of 3×3 elements in the input mask corresponds to a single element in the reduced mask. In this example, the mask coordinates (0, 0) and (4, 4) are displayed for elements in the upper left and lower right, respectively.

The reduced mask shown in the center of FIG. 13 is not actually used in filtering operations, but is provided to illustrate the principles of generating the reduced mask. In this reduced mask, elements have hatch marks when the corresponding section of the input mask on the left of the drawing includes elements used in the filtering operations and are white when the corresponding section does not include such elements. The center element of the reduced mask is filled in black.

Beneath the small reduced mask in the center of FIG. 13 is an enlarged view of the reduced mask indicating basic (prior to applying weight) filter coefficients in all elements calculated according to a normal distribution function. Since elements without hatch marks correspond to sections of the input mask having no elements used in filtering operations, these elements of the reduced mask are also not used in filtering operations. The coordinates and filter coefficients for these elements are not stored in the reduced mask memory area 23a15. Therefore, these filter coefficients are indicated in parentheses in this drawing.

When comparing the input mask to the reduced mask in this example, it is apparent that the patterns of elements used in the masks (or the pattern of skipped elements) are different. When forming a reduced mask by reducing an input mask having a skipped pattern, it is necessary to use some technique for determining whether each element of the reduced mask is used. Here, after setting the size of a reduced mask, it is possible to create the reduced mask from a input mask by setting filter coefficients in elements of the reduced mask when the corresponding sections of the input mask include elements with filter coefficients and not setting filter coefficients in elements of the reduced mask when the corresponding section of the input mask does not include elements with filter coefficients. However, since the pattern of elements in the input mask and reduced mask of FIG. 13 are clearly different, this technique clearly cannot reflect the pattern of the input mask in the reduced mask, reducing the coherence of the two masks.

On the far right, FIG. 13 shows the reduced mask used for filtering operations on the reduced image in the present embodiment, as well as an enlarged view of the reduced mask therebelow. As with the reduced mask shown in the center of FIG. 13, the reduced mask on the right has hatch marks for elements used in filtering operations and no hatch marks for unused elements. Also, mask coordinates (0, 0) and (4, 4) are indicated for elements in the top left and bottom right, respectively.

As shown in the enlarged view of the reduced mask on the right, filter coefficients stored in elements of the reduced mask are given weight based on the number of elements in the corresponding section of the input mask that are used in filtering operations (elements with filter coefficients). For example, the section of the input mask corresponding to the upper left element in the reduced mask with coordinates (0, 0) is a rectangular region configured of 3×3 elements having mask coordinates (0, 0)-(2, 2).

In this section, two of the elements are used in filtering operations. As shown in the reduced mask in the center of FIG. 13, the filter coefficient found from a normal distribution function for mask coordinates (0, 0) of the reduced mask is 0.37. Therefore, the filter coefficient 0.37×2=0.74 is stored in element (0, 0) of the reduced mask in the present embodiment.

Further, the section of the input mask corresponding to element (1, 0) of the reduced mask is a 3×3 element rectangular region including mask coordinates (3, 0)-(5, 2), none of which elements include filter coefficients. Therefore, the element with coordinates (1, 0) of the reduced mask is set as an element not used in filtering operations.

In this way, the MFP 101 of the present embodiment converts the pattern of skipped pixels in the input mask to weights corresponding to the original filter coefficients of the Gaussian filter. By generating each filter coefficient in the reduced mask while giving such a weight thereto, it is possible to create the reduced mask that reflects the state of skipped elements (skipped pattern) in the input mask. Hence, while the patterns of the input mask and reduced mask are different, the MFP 101 of the present embodiment artificially reflects the pattern (content) of the input mask in the reduced mask by manipulating the filter coefficients.

After completing the process in S80, in S81 the CPU 21 determines whether x is less than m−1 (x<m−1), i.e., whether the process has reached the final element in the row with respect to the x-axis. If x is greater than or equal to m−1 (S81: NO), then the process has reached the final element of the row. Next, in S82 the CPU 21 checks whether y is less than n−1 (y<n−1), i.e., whether the process has reached the final row. If y is greater than or equal to n−1 (S82: NO), indicating that the process has been completed for the last element in the last row (the final coordinates of the mask), the mask generation process of S12 ends.

If the CPU 21 confirms in S70 that the mask size m of the reduced mask is odd (S70: YES), the CPU 21 is skips S71 and advances directly to S72. Similarly, if the CPU 21 determines in S72 that the mask size n of the reduced mask is odd (S72: YES), then the CPU 21 skips 373 and advances directly to S74. Also, if the CPU 21 determines in S81 that x is less than m−1 (S81: YES), indicating that the CPU 21 has not yet reached the final element in the row of the reduced mask, then in S83 the CPU 21 adds 1 to the current x coordinate of the reduced mask, updating the x coordinate to indicate the next element for which a filter coefficient is to be calculated. Also in S83, the CPU 21 adds 1 to α (X coordinate for the lower right element in the section), to set the X coordinate to the top coordinate of the next section in the input mask. Subsequently, the CPU 21 returns to S77. In this way, the CPU 21 repeatedly calculates filter coefficients of elements in the reduced mask until reaching the final section in one row of the input mask.

Further, if the CPU 21 determines in S82 that y is less than n−1 (S82: YES), indicating that the process has reached the final element of a row in the reduced mask but not the final row, then in S84 the CPU 21 adds 1 to the current y coordinate for the reduced mask and also resets the x coordinate for the reduced mask to 0 in order to update the x, y coordinates to indicate the next element (the first element of the next row) for which a filter coefficient is to be calculated. Also in S84, the CPU 21 sets the current X coordinate of the input mask (X coordinate for the upper left element of a section) to 0 and adds 1 to β (the Y coordinate for the lower right element of the section), in order to set the Y coordinate to the top element in the next section of the input mask, and subsequently returns to S77. In this way, the CPU 21 repeatedly executes this process until reaching the final row of the input mask.

In this way, the MFP 101 creates the reduced mask by reducing the input mask of the predetermined size based on the reduction ratio for the reduced image. Hence, the size of the original image mask does not change based on the size of the inputted original image. In other words, the upper limit for the size of the input mask is always known, thereby eliminating the need to allocate a large amount of memory to store the input mask and reducing the amount of memory that must be provided for performing image correction. Further, since the skipped pattern in the input mask can be reflected in the reduced mask, this method improves coherence between the two masks, enhances the suitability of the clipped range found from the reduced mask for the original image, and improves calculating speed in the filtering process.

Modification of the Second Embodiment

Next, a modification of the second embodiment will be described with reference to FIGS. 14 and 15. The MFP 101 according to the second embodiment described above produces filter coefficients to be stored in each element of the reduced mask by applying weight to the a filter coefficient calculated according to a normal distribution function based on the number of used elements in the section of the input mask corresponding to the subject element of the reduced mask. However, in the modification, the MFP 101 generates filter coefficients for each element of the reduced mask by applying weight to a filter coefficient calculated according to the normal distribution function based on the sum of filter coefficients stored in used elements of the corresponding section in the input mask. In the following description, like parts and elements are designated with the same reference numerals to avoid duplicating description.

Rather than generating an input mask, the MFP 101 according to the modification stores a default input mask in which the arrangement of elements used in filtering operations, the filter coefficients stored in each element, and the mask size are preset. Therefore, the memory for storing the input mask in the modification is provided in the ROM 22 rather than the RAM 23. The arrangement of elements in the input mask used in filtering operations is determined by selecting identification numbers or mask coordinates assigned each element based on random numbers.

Figure 14:
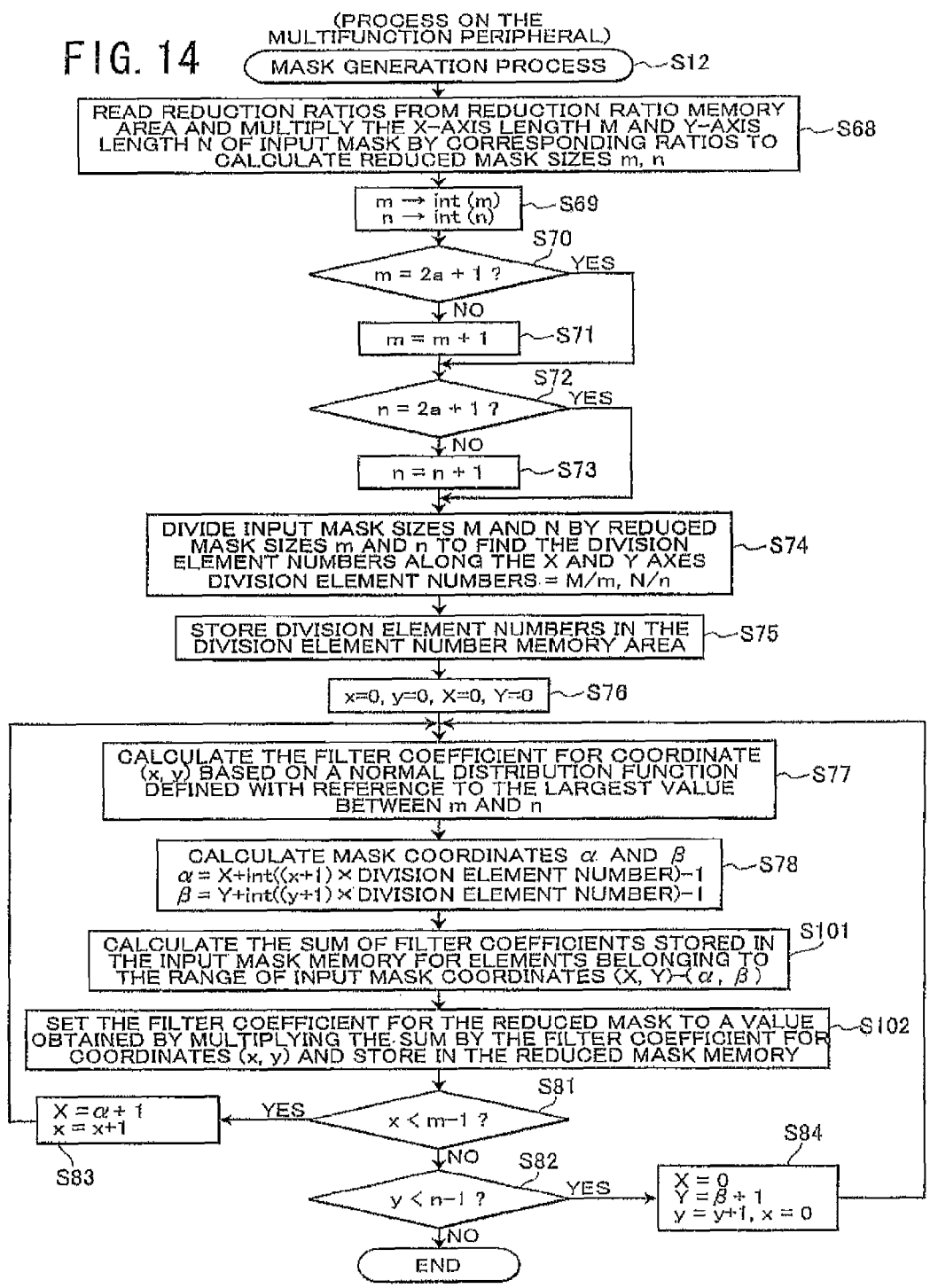
FIG. 14 is a flowchart illustrating steps in a mask generation process according to the second embodiment.

FIG. 14 is a flowchart illustrating steps in the mask generation process of S12 according to the modification.

Since it is not necessary to generate an input mask in the mask generation process according to the modification, steps S61-S67 shown in FIG. 9A are omitted from this process. Similarly to the second embodiment, in S68-S77 of the mask generation process according to the modification, the CPU 21 reads the reduction ratios stored in the reduction ratio memory area 23*a*2, multiplies the input mask sizes M, N by the corresponding reduction ratios to calculate reduced mask sizes m, n, converts the reduced mask sizes ra, n to integers, corrects the integer values to odd values, calculates the division element numbers, and generates filter coefficients for the reduced mask according to a normal distribution function.

After finding mask coordinates (α, β) in S78, in S101 the CPU 21 calculates the sum of filter coefficients stored in the input mask memory for elements belonging to the range of mask coordinates (X, Y) to (α, β). In S102 the CPU 21 multiplies this sum by the filter coefficient of the element having coordinate (x, y) found in S77, sets this value as the filter coefficient for the coordinate (x, y) in the reduced mask, and stores the filter coefficient in the reduced mask memory area 23*a*15 in association with its mask coordinates (x, y). The filter coefficients are calculated for all elements of the reduced mask (S81-S84).

The default input mask stored in the input mask memory in the modification has filter coefficients only for elements that are to be used in filtering operations. For cases in which the section of the input mask corresponding to the element in the reduced mask has no elements to be used in filtering operations, the coordinates and filter coefficients for elements belonging to the range of mask coordinates (X,Y) to (α, β) are not stored in the input mask memory in S101. Therefore, the sum of filter coefficients is not calculated in S101, and the CPU 21 skips S102 to advance directly to S81.

Figure 15:
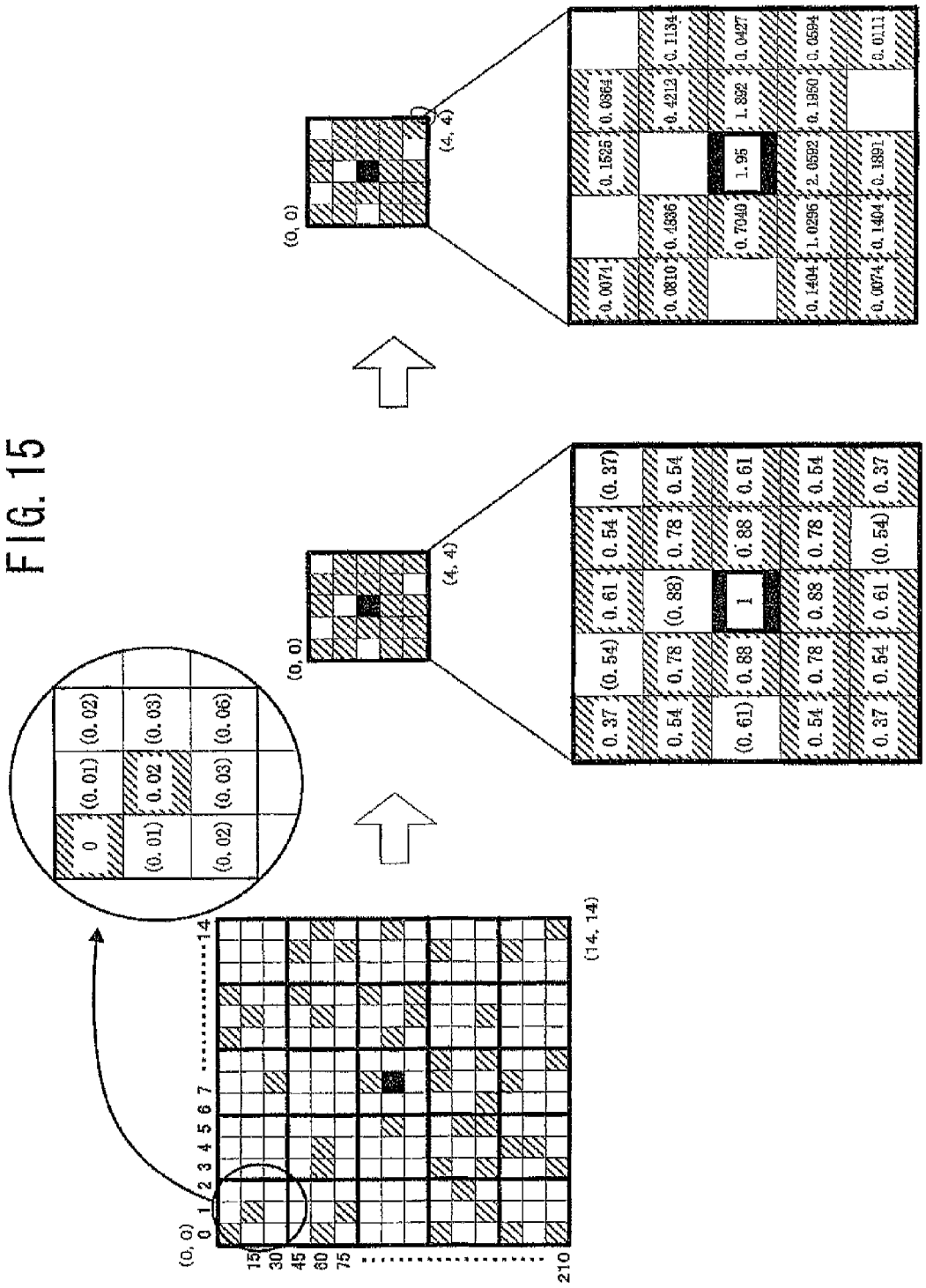
FIG. 15 is an explanatory diagram illustrating the principles of generating the reduced mask according to a modification of the second embodiment that reflects the skipped pattern of the input mask.

FIG. 15 illustrates the principles for generating the reduced mask according to the modification. As in FIG. 13 described above, the leftmost side of FIG. 15 shows an input mask configured of a 15×15 matrix, while the center and rightmost aides of the drawing show reduced masks configured of a 5×5 matrix generated from the input mask. Below each reduced mask is displayed an enlarged view of the reduced mask. Further, identification numbers 0, 1, 2, 3, 4, 5, 6, 7, . . . , and 14 have been assigned to elements in the top row of the input mask and identification numbers (0), 15, 30, 45, 60, 75, . . . , and 210 have been assigned to elements along the leftmost column of the input mask.

The reduced mask in the center is not actually used for filtering operations but is provided for illustrating the principles of generating the reduced mask. The enlarged image in the center shows basic filter coefficients calculated according to a normal distribution function. The rightmost reduced mask is used for filtering operations on the reduced image in the modification. The enlarged view of the reduced mask on the right shows the filter coefficients found for each element by applying weight based on the sum of filter coefficients stored in elements of the corresponding section in the input mask that are actually used in filtering operations.

In FIG. 15, mask coordinates are displayed for elements positioned in the upper left and lower right of each mask. Further, elements with hatch marks are actually used in filtering operations, while blank elements are not. Further, the black filled elements indicate the center element that is aligned with the target pixel.

For example, the section of the input mask corresponding to element (0, 0) in the upper left of the reduced mask is a 3×3 rectangular region having mask coordinates (0, 0)-(2, 2).

In this section, two of the elements are used in filtering operations. The filter coefficients for this section are displayed in an enlarged view diagonally above and right of the input mask. As shown, the two elements used in filtering operations have the filter coefficients 0 and 0.02. While the enlarged view shows filter coefficients for each element of the input mask found from the normal distribution function, filter coefficients not used for filtering operations (not stored in the elements) are indicated in parentheses.

A filter coefficient of 0.37 is found for the corresponding mask coordinates (0, 0) of the reduced mask according to the normal distribution function (see the reduced mask in the center of FIG. 15). The filter coefficient stored in element (0, 0) of the reduced mask used in the modification is found by multiplying 0.37 by the sum 0.02 of filter coefficients used in the corresponding section of the input mask, or 0.0074.

Similar calculations are performed for the other elements in the reduced mask. That is, when the corresponding section of the input mask includes filter coefficients used in calculations, the sum of these filter coefficients is calculated and multiplied by the basic filter coefficient found from the normal distribution function in order to weight the filter coefficient, thereby deriving filter coefficients for each element of the reduced image. Filter coefficients found according to these calculations are displayed in the corresponding elements in the rightmost reduced mask of FIG. 15. When the corresponding section of the input mask does not include filter coefficients used in calculations, the corresponding element of the reduced mask is also not used in filtering operations and, hence, a filter coefficient is not stored in this element, as described above.

In this way, the MFP 101 according to the modification employs the sum of filter coefficients in a section of the input mask as weight for the filter coefficient of the corresponding element in the reduced mask when this section of the input mask has filter coefficients used in calculations. Therefore, the MFP 101 can reflect the content of the input mask in the reduced mask, enhance the coherence between the two masks, and find a clipped range from the reduced image configured of parameters suitable for the original image.

Other Modifications of the Second Embodiment

For example, while elements of the input mask assigned filter coefficients (elements used in filtering operations) are selected based on the random numbers in the second embodiment and its modification, the user or designer may be allowed to select desired elements.

Further, in the mask generation process of S12 in the second embodiment and its modification described above, filter coefficients are calculated and stored only for elements of the reduced mask to be used in filtering operations. However, the filter coefficients may be initially calculated for all elements, with the results stored in the reduced mask memory area 23*a*15, and data indicating whether elements are to be used can be assigned for enabling the CPU 21 to distinguish the elements.

Further, while the MFP 101 generates an input mask in the second embodiment and an input mask is prestored in the ROM 22 of the MFP 101 in the modification, it is also possible to prestore an input mask in the MFP 101 of the second embodiment and to generate an input mask in the MFP 101 of the modification.

In the mask generation process of S12 in the second embodiment and its modification described above, in S77 the MFP 101 calculates filter coefficients according to a normal distribution function (prior to applying weight) for all elements in the reduced mask. However, the process in S77 may be performed after S78 and S79 and may be skipped when the corresponding section of the input mask has no usable elements, thereby avoiding unnecessary calculations of filter coefficients.

Further, while the input mask in the second embodiment and its modification described above is divided so that all elements of the input mask are incorporated in the reduced mask, it is not necessary to incorporate all elements of the input mask in the reduced mask. For example, the total number of elements in the input mask can be divided by the number of elements in the reduced mask, discarding the fraction, and only those elements of the input mask, whose number is an integer multiple of the number of elements in the reduced mask, may be applied to the reduced mask.

Further, while the number of elements belonging to one section of the input mask is adjusted to an integer value in the mask generation process of S12 according to the second embodiment and its modification, a section divided by each dividing position derived from the division element number may be set, without being adjusted, to correspond with one element in the reduced mask.

While the invention has been described in detail with reference to the embodiments thereof, it would be apparent to those skilled in the art that various changes and modifications may be made therein without departing from the spirit of the invention.

For example, while the MFPs 1 and 101 of the embodiments are configured to perform the Retinex process on the luminance signal Y (luminance signal Ys), the MFPs 1 and 101 may perform the Retinex process on the RGB values instead.

In the first embodiment, the size m×n of the reduced mask may be determined based on the size M×N of the input mask in the same manner as in the processes of S68-S73 in the second embodiment.

In the first embodiment, a filter coefficient is set to each element in each of the input mask and the reduced mask according to a normal distribution function so that a normal distribution curve is depicted along the entire width of the each mask as shown in FIG. 10(*b*) similarly to the second embodiment. When the reduced mask is formed in a rectangular shape, the filter coefficient for each element in the reduced mask may be calculated according to a normal distribution function defined based on the larger of the mask size m for the X-axis and the mask size n for the Y-axis, similarly to the second embodiment as described with reference to FIG. 11.

In the first embodiment, the input mask and the reduced mask have different sizes. However, the input mask and the reduced mask may have the same size. In this case, the input mask and the reduced mask may have filter coefficients of the same values arranged in the same pattern.

In the first embodiment, the mask generating step of S12 may be executed in the same manner as in the second embodiment.

In the second embodiment, the input mask has a pattern with skipped elements. That is, some elements in the input mask are not used for a filtering operation. However, the input mask may have no skipped elements. All the elements in the input mask may be used for a filtering operation. In order to generate such the input mask in S12, instead of executing the processes of S61-S67, the CPU 21 calculates the filtering coefficients for all the M×N elements in the input mask, and stores the calculated filter coefficients in the input mask memory area 23*a*14 in association with the mask coordinates.

What is claimed is:

1. An image processor comprising:
    a reduced image forming unit that forms a reduced image by reducing an original image;
    a reduced image peripheral average value generating unit that generates a peripheral average value for each pixel of the reduced image by performing a filtering operation on a peripheral pixel region for the each pixel, the peripheral pixel region including peripheral pixels for the each pixel, the peripheral pixels for the each pixel including the each pixel and pixels adjacent to and surrounding the each pixel;
    a reduced image reflectance component calculating unit that calculates a reflectance component indicating a ratio of brightness between each pixel and the peripheral pixels thereof for the each pixel in the reduced image based on the results of logarithmic operations performed on the peripheral average value and the value of the each pixel in the reduced image;
    a frequency distribution generating unit that generates a frequency distribution of the frequency of each value of reflectance component calculated by the reduced image reflectance component calculating unit;
    a representative reflectance component determining unit that determines a representative reflectance component based on the frequency distribution;
    a normal correcting unit that performs a normal correcting operation for correcting a value of a target pixel in the original image, the normal correcting unit including:

an original image peripheral average value generating unit that generates a peripheral average value for the target pixel of the original image by performing a filtering operation on a peripheral pixel region for the target pixel, the peripheral pixel region including peripheral pixels for the target pixel, the peripheral pixels for the target pixel including the target pixel and pixels adjacent to and surrounding the target pixel;

an original image reflectance component calculating unit that calculates a reflectance component indicating a ratio of brightness between the target pixel and the peripheral pixels thereof in the original image based on the results of logarithmic operations performed on the peripheral average value and the value of the target pixel in the original image; and a converting unit that converts the value of the target pixel in the original image to an output value based on the reflectance component of the target pixel and the value of the target pixel, thereby calibrating the value of the target pixel in the original image according to the ratio of brightness values between the target pixel and the peripheral pixels thereof; and a simplified correcting unit that performs a simplified correcting operation for correcting the value of the target pixel in the original image by converting the value of the target pixel to an output value based on the representative reflectance component and the value of the target pixel in the original image.

2. An image processor according to claim 1, further comprising a normalization parameter setting unit that sets a normalization parameter based on the frequency distribution, wherein the normal correcting unit further includes a normalizing unit that normalizes the reflectance component for the target pixel in the original image based on the normalization parameter, the converting unit converting the value of the target pixel in the original image into the output value by using the normalized reflectance component, and wherein the representative reflectance component determining unit includes a representative-reflectance normalizing unit that normalizes the determined representative reflectance component based on the normalization parameter, the simplified correcting unit converting the value of the target pixel in the original image to an output value by using the normalized representative reflectance component.

3. An image processor according to claim 1, further comprising:

a judging unit that judges whether it is possible to allocate a memory area required to perform the correcting operation onto the original image by the normal correcting unit; and a controlling unit that controls the normal correcting unit to perform its normal correcting operation when the judging unit determines that sufficient memory can be allocated, and that controls the simplified correcting unit to perform its simplified correcting operation when the judging unit determines that sufficient memory cannot be allocated.

4. An image processor according to claim 3, wherein the judging unit judges, before correcting one target pixel in the original image, whether it is possible to allocate a memory area required to perform the normal correcting operation in the original image by the normal correcting unit, the controlling unit controlling the normal correcting unit to perform its normal correcting operation onto the subject target pixel when the judging unit determines that sufficient memory can be allocated, and that controls the simplified correcting unit to perform its simplified correcting operation onto the subject target pixel when the judging unit determines that sufficient memory cannot be allocated.

5. An image processor according to claim 3, wherein the judging unit judges, before correcting all the target pixels in the original image, whether it is possible to allocate a memory area required to perform the normal correcting operation in the original image by the normal correcting unit, the controlling unit controlling the normal correcting unit to perform its normal correcting operation onto all the pixels in the original image when the judging unit determines that sufficient memory can be allocated, and that controls the simplified correcting unit to perform its simplified correcting operation onto all the pixels in the original image when the judging unit determines that sufficient memory cannot be allocated.

6. An image processor according to claim 1, wherein the representative reflectance component determining unit determines, as the representative reflectance component, a reflectance component that appears most frequently in the frequency distribution.

7. An image processor according to claim 1, wherein the representative reflectance component determining unit determines, as the representative reflectance component, a reflectance component having a median value among all the reflectance components appearing in the frequency distribution.

8. An image processor according to claim 1, further comprising:

an original image mask storing unit that stores an original image mask in a form of a two-dimensional matrix having filter coefficients; and a reduced image mask generating unit that generates a reduced image mask based on the original image mask and based on a size ratio of the original image and the reduced image, wherein the reduced image peripheral average value generating unit generates the peripheral average value for each pixel of the reduced image by performing the filtering operation by using the reduced image mask on the peripheral pixel region for the each pixel, and wherein the original image peripheral average value generating unit generates the peripheral average value for the target pixel of the original image by performing the filtering operation by using the original image mask on the peripheral pixel region for the target pixel.

9. An image processor comprising:

a reduced image forming unit that forms a reduced image by reducing an original image;

a reduced image peripheral average value generating unit that generates a peripheral average value for each pixel of the reduced image by performing a filtering operation on a peripheral pixel region for the each pixel, the peripheral pixel region including peripheral pixels for the each pixel, the peripheral pixels for the each pixel including the each pixel and pixels adjacent to and surrounding the each pixel;

a reduced image reflectance component calculating unit that calculates a reflectance component indicating a ratio of brightness between each pixel and the peripheral pixels thereof for the each pixel in the reduced image based on the results of logarithmic operations performed on the peripheral average value and the value of the each pixel in the reduced image;

a frequency distribution generating unit that generates a frequency distribution of the frequency of each value of reflectance component calculated by the reduced image reflectance component calculating unit;

a representative reflectance component determining unit that determines a representative reflectance component based on the frequency distribution; and a correcting unit that corrects a value of a target pixel in the original image by converting the value of the target pixel in the original image to an output value based on the representative reflectance component and the value of the target pixel, thereby calibrating the value of the target pixel in the original image.

10. An image processor according to claim 9, further comprising:

an original image mask storing unit that stores an original image mask in a form of a two-dimensional matrix having filter coefficients; and a reduced image mask generating unit that generates a reduced image mask based on the original image mask and based on a size ratio of the original image and the reduced image, wherein the reduced image peripheral average value generating unit generates the peripheral average value for each pixel of the reduced image by performing the filtering operation by using the reduced image mask on the peripheral pixel region for the each pixel.

11. An image processing method comprising:

forming a reduced image by reducing an original image;

generating a peripheral average value for each pixel of the reduced image by performing a filtering operation on a peripheral pixel region for the each pixel, the peripheral pixel region including peripheral pixels for the each pixel, the peripheral pixels for the each pixel including the each pixel and pixels adjacent to and surrounding the each pixel;

calculating a reflectance component indicating a ratio of brightness between each pixel and the peripheral pixels thereof for the each pixel in the reduced image based on the results of logarithmic operations performed on the peripheral average value and the value of the each pixel in the reduced image;

generating a frequency distribution of the frequency of each value of the reflectance component calculated for the reduced image;

determining a representative reflectance component based on the frequency distribution;

performing either one of a normal correcting operation and a simplified correcting operation to correct a value of a target pixel in the original image, the performing the normal correcting operation including:
 generating a peripheral average value for the target pixel of the original image by performing a filtering operation on a peripheral pixel region for the target pixel, the peripheral pixel region including peripheral pixels for the target pixel, the peripheral pixels for the target pixel including the target pixel and pixels adjacent to and surrounding the target pixel;
 calculating a reflectance component indicating a ratio of brightness between the target pixel and the peripheral pixels thereof in the original image based on the results of logarithmic operations performed on the peripheral average value and the value of the target pixel in the original image; and
 converting the value of the target pixel in the original image to an output value based on the reflectance component of the target pixel and the value of the target pixel, thereby calibrating the value of the target pixel in the original image according to the ratio of brightness values between the target pixel and the peripheral pixels thereof, and the performing the simplified correcting operation including converting the value of the target pixel to an output value based on the representative reflectance component and the value of the target pixel in the original image.

12. A non-transitory computer readable medium storing a set of program instructions executable on a data processing device, instructions comprising:

forming a reduced image by reducing an original image;

generating a peripheral average value for each pixel of the reduced image by performing a filtering operation on a peripheral pixel region for the each pixel, the peripheral pixel region including peripheral pixels for the each pixel, the peripheral pixels for the each pixel including the each pixel and pixels adjacent to and surrounding the each pixel;

calculating a reflectance component indicating a ratio of brightness between each pixel and the peripheral pixels thereof for the each pixel in the reduced image based on the results of logarithmic operations performed on the peripheral average value and the value of the each pixel in the reduced image;

generating a frequency distribution of the frequency of each value of the reflectance component calculated for the reduced image;

determining a representative reflectance component based on the frequency distribution;

performing either one of a normal correcting operation and a simplified correcting operation to correct a value of a target pixel in the original image, the performing the normal correcting operation including:
 generating a peripheral average value for the target pixel of the original image by performing a filtering operation on a peripheral pixel region for the target pixel, the peripheral pixel region including peripheral pixels for the target pixel, the peripheral pixels for the target pixel including the target pixel and pixels adjacent to and surrounding the target pixel;
 calculating a reflectance component indicating a ratio of brightness between the target pixel and the peripheral pixels thereof in the original image based on the results of logarithmic operations performed on the peripheral average value and the value of the target pixel in the original image; and
 converting the value of the target pixel in the original image to an output value based on the reflectance component of the target pixel and the value of the target pixel, thereby calibrating the value of the target pixel in the original image according to the ratio of brightness values between the target pixel and the peripheral pixels thereof, and the performing the simplified correcting operation including converting the value of the target pixel to an output value based on the representative reflectance component and the value of the target pixel in the original image.

13. An image processing method, comprising:

forming a reduced image by reducing an original image;

generating a peripheral average value for each pixel of the reduced image by performing a filtering operation on a peripheral pixel region for the each pixel, the peripheral pixel region including peripheral pixels for the each pixel, the peripheral pixels for the each pixel including the each pixel and pixels adjacent to and surrounding the each pixel;

calculating a reflectance component indicating a ratio of brightness between each pixel and the peripheral pixels thereof for the each pixel in the reduced image based on the results of logarithmic operations performed on the peripheral average value and the value of the each pixel in the reduced image;

generating a frequency distribution of the frequency of each value of the reflectance component calculated for the reduced image;

determining a representative reflectance component based on the frequency distribution; and correcting a value of a target pixel in the original image by converting the value of the target pixel in the original image to an output value based on the representative reflectance component and the value of the target pixel, thereby calibrating the value of the target pixel in the original image.

14. A non-transitory computer readable medium storing a set of program instructions executable on a data processing device, instructions comprising:

forming a reduced image by reducing an original image;

generating a peripheral average value for each pixel of the reduced image by performing a filtering operation on a peripheral pixel region for the each pixel, the peripheral pixel region including peripheral pixels for the each pixel, the peripheral pixels for the each pixel including the each pixel and pixels adjacent to and surrounding the each pixel;

calculating a reflectance component indicating a ratio of brightness between each pixel and the peripheral pixels thereof for the each pixel in the reduced image based on the results of logarithmic operations performed on the peripheral average value and the value of the each pixel in the reduced image;

generating a frequency distribution of the frequency of each value of the reflectance component calculated for the reduced image;

determining a representative reflectance component based on the frequency distribution; and correcting a value of a target pixel in the original image by converting the value of the target pixel in the original image to an output value based on the representative reflectance component and the value of the target pixel, thereby calibrating the value of the target pixel in the original image.

15. An image processor comprising:

an original image mask storing unit that stores an original image mask in a form of a two-dimensional matrix having filter coefficients;

a reduced image mask generating unit that generates a reduced image mask based on the original image mask and based on a size ratio of an original image and a reduced image;

a reduced image forming unit that forms a reduced image by reducing the original image at the size ratio;

a reduced image peripheral average value generating unit that generates a peripheral average value for each pixel of the reduced image by performing a filtering operation by using the reduced image mask on a peripheral pixel region for the each pixel, the peripheral pixel region including peripheral pixels for the each pixel, the peripheral pixels for the each pixel including the each pixel and pixels adjacent to and surrounding the each pixel;

a reduced image reflectance component calculating unit that calculates a reflectance component indicating a ratio of brightness between each pixel and the peripheral pixels thereof for the each pixel in the reduced image based on the results of logarithmic operations performed on the peripheral average value and the value of the each pixel in the reduced image;

a frequency distribution generating unit that generates a frequency distribution of the frequency of each value of reflectance component calculated by the reduced image reflectance component calculating unit;

a normalization parameter setting unit that sets a normalization parameter based on the frequency distribution;

an original image peripheral average value generating unit that generates a peripheral average value for the target pixel of the original image by performing a filtering operation by using the original image mask on a peripheral pixel region for the target pixel, the peripheral pixel region including peripheral pixels for the target pixel, the peripheral pixels for the target pixel including the target pixel and pixels adjacent to and surrounding the target pixel;

an original image reflectance component calculating unit that calculates a reflectance component indicating a ratio of brightness between the target pixel and the peripheral pixels thereof in the original image based on the results of logarithmic operations performed on the peripheral average value and the value of the target pixel in the original image;

a normalizing unit that normalizes the reflectance component for the target pixel based on the normalization parameter; and a converting unit that converts the value of the target pixel in the original image to an output value based on the normalized reflectance component of the target pixel and the value of the target pixel, thereby calibrating the value of the target pixel in the original image according to the ratio of brightness values between the target pixel and the peripheral pixels thereof.

16. An image processor according to claim 15, wherein the original image mask comprises elements, the number of elements used in filtering operations being smaller than the total number of elements constituting the original image mask; and the reduced image mask generating unit comprises:

an element number determining unit that determines a total number of elements constituting the reduced image mask based on the size ratio of the original image and the reduced image;

a dividing unit that divides the original image mask by the total number of elements in the reduced image mask; and a weighted filter coefficient calculating unit that calculates a filter coefficient for a target element of the reduced image mask based on a predetermined formula and that modifies the filter coefficient by applying thereto a weight that is determined based on the number of elements that is used in the filtering operation in one division of the original image mask corresponding to the position of the target element in the reduced image mask, thereby generating a reduced image mask that reflects a pattern of elements used in the original image mask.

17. An image processor according to claim 15, wherein the original image mask comprises elements, the number of elements used in filtering operations being smaller than the total number of elements constituting the original image mask; and the reduced image mask generating unit comprises:

an element number determining unit that determines a total number of elements constituting the reduced image mask based on the size ratio of the original image and the reduced image;

a dividing unit that divides the original image mask by the total number of elements in the reduced image mask; and a weighted filter coefficient calculating unit that calculates a filter coefficient for a target element of the reduced image mask based on a predetermined formula and that modifies the filter coefficient by applying thereto a weight that is determined based on a sum of filter coefficients for elements that are used in the filtering operation in one division of the original image mask corresponding to the position of the target element in the reduced image mask, thereby generating a reduced image mask that reflects a pattern of elements used in the original image mask.

18. An image processor according to claim 16, wherein the dividing unit divides all the elements in the original image mask into divisions of the original image mask that are respectively associated with all the elements of the reduced image mask.

19. An image processor according to claim 18, wherein the dividing unit comprises:

a corresponding element number calculating unit that calculates a number of elements in the original image mask corresponding to one element in the reduced image mask based on the ratio of sizes of the reduced image mask and the original image mask;

a dividing position calculating unit that calculates dividing positions for dividing the original image mask uniformly by the calculated number of elements; and an integer generating unit that converts the number of elements included between division positions to an integer number by shifting the dividing position toward the nearest of two neighboring elements at the dividing position, thereby dividing all elements in the original image mask into the divisions of the original image mask by adjusting the dividing positions in the original image mask to modify the number of elements included in the divisions between dividing positions.

20. An image processor according to claim 16, wherein the elements of the original image mask used in filtering operations are determined by randomly selecting values identifying the elements.

21. An image processor according to claim 15, wherein the reduced image mask generating unit comprises:

an even number determining unit that determines whether the number of elements in the reduced image mask formed based on the size ratios of the original image and reduced image is an even number; and an element number adjusting unit that changes the number of elements in the reduced image mask to an odd number when the even number determining unit determines that the reduced image mask has an even number of elements.

22. An image processing method, comprising:

generating a reduced image mask based on an original image mask and based on a size ratio of an original image and a reduced image, the original image mask being in a form of a two-dimensional matrix having filter coefficients;

forming a reduced image by reducing the original image at the size ratio;

generating a peripheral average value for each pixel of the reduced image by performing a filtering operation by using the reduced image mask on a peripheral pixel region for the each pixel, the peripheral pixel region including peripheral pixels for the each pixel, the peripheral pixels for the each pixel including the each pixel and pixels adjacent to and surrounding the each pixel;

calculating a reflectance component indicating a ratio of brightness between each pixel and the peripheral pixels thereof for the each pixel in the reduced image based on the results of logarithmic operations performed on the peripheral average value and the value of the each pixel in the reduced image;

generating a frequency distribution of the frequency of each value of the reflectance component calculated for the reduced image;

setting a normalization parameter based on the frequency distribution;

generating a peripheral average value for the target pixel of the original image by performing a filtering operation by using the original image mask on a peripheral pixel region for the target pixel, the peripheral pixel region including peripheral pixels for the target pixel, the peripheral pixels for the target pixel including the target pixel and pixels adjacent to and surrounding the target pixel;

calculating a reflectance component indicating a ratio of brightness between the target pixel and the peripheral pixels thereof in the original image based on the results of logarithmic operations performed on the peripheral average value and the value of the target pixel in the original image;

normalizing the reflectance component for the target pixel based on the normalization parameter; and converting the value of the target pixel in the original image to an output value based on the normalized reflectance component of the target pixel and the value of the target pixel, thereby calibrating the value of the target pixel in the original image according to the ratio of brightness values between the target pixel and the peripheral pixels thereof.

23. A non-transitory computer readable medium storing a set of program instructions executable on a data processing device, instructions comprising:

generating a reduced image mask based on an original image mask and based on a size ratio of an original image and a reduced image, the original image mask being in a form of a two-dimensional matrix having filter coefficients;

forming a reduced image by reducing the original image at the size ratio;

generating a peripheral average value for each pixel of the reduced image by performing a filtering operation by using the reduced image mask on a peripheral pixel region for the each pixel, the peripheral pixel region including peripheral pixels for the each pixel, the peripheral pixels for the each pixel including the each pixel and pixels adjacent to and surrounding the each pixel;

calculating a reflectance component indicating a ratio of brightness between each pixel and the peripheral pixels thereof for the each pixel in the reduced image based on the results of logarithmic operations performed on the peripheral average value and the value of the each pixel in the reduced image;

generating a frequency distribution of the frequency of each value of the reflectance component calculated for the reduced image;

setting a normalization parameter based on the frequency distribution;

generating a peripheral average value for the target pixel of the original image by performing a filtering operation by using the original image mask on a peripheral pixel region for the target pixel, the peripheral pixel region including peripheral pixels for the target pixel, the peripheral pixels for the target pixel including the target pixel and pixels adjacent to and surrounding the target pixel;

calculating a reflectance component indicating a ratio of brightness between the target pixel and the peripheral pixels thereof in the original image based on the results of logarithmic operations performed on the peripheral average value and the value of the target pixel in the original image;

normalizing the reflectance component for the target pixel based on the normalization parameter; and converting the value of the target pixel in the original image to an output value based on the normalized reflectance component of the target pixel and the value of the target pixel, thereby calibrating the value of the target pixel in the original image according to the ratio of brightness values between the target pixel and the peripheral pixels thereof.

* * * * *